US008360445B2

(12) United States Patent
Meers et al.

(10) Patent No.: US 8,360,445 B2
(45) Date of Patent: Jan. 29, 2013

(54) ROLL-OUT CART

(75) Inventors: Ryan C. Meers, Santa Monica, CA (US); Kyle L. Baltz, Redondo Beach, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 527 days.

(21) Appl. No.: 12/575,500

(22) Filed: Oct. 8, 2009

(65) Prior Publication Data

US 2010/0090428 A1 Apr. 15, 2010

Related U.S. Application Data

(60) Provisional application No. 61/105,019, filed on Oct. 13, 2008, provisional application No. 61/167,953, filed on Apr. 9, 2009.

(51) Int. Cl.
*B62B 1/10* (2006.01)

(52) U.S. Cl. .................................... 280/47.26; 220/318

(58) Field of Classification Search ............... 280/47.17, 280/47.24, 47.26, 47.34, 47.35, 79.2; 220/318, 220/810, 908
See application file for complete search history.

(56) References Cited

U.S. PATENT DOCUMENTS 806,885 A 12/1905 Focht
1,466,606 A 8/1923 Trageser et al.
1,559,594 A 11/1925 Wentorf et al.
2,873,880 A 2/1959 Poulos
3,273,747 A * 9/1966 Kalz ............................ 220/318
3,390,804 A 7/1968 Morgan
4,111,476 A 9/1978 Jacobs
4,279,357 A 7/1981 Robinson
4,319,762 A * 3/1982 Streit et al. .................. 280/79.2
4,691,840 A 9/1987 Ferbrache
4,818,502 A 4/1989 Taschner
4,819,827 A 4/1989 DiSesa
4,917,261 A 4/1990 Borst
4,986,438 A 1/1991 Borst
5,050,762 A 9/1991 Giorgi
5,071,024 A 12/1991 Delmerico et al.
5,103,994 A 4/1992 Doxey et al.
5,160,060 A 11/1992 Garofalo, Jr.
5,163,577 A 11/1992 Lee
5,251,780 A 10/1993 Lee
5,520,303 A 5/1996 Bernstein et al.
5,547,104 A 8/1996 Parker
5,699,929 A 12/1997 Ouno
5,738,395 A 4/1998 Probst
5,906,292 A 5/1999 Rider, Jr.
6,116,452 A * 9/2000 Hamel et al. ................. 220/318
6,276,557 B1 8/2001 Wysocki
6,328,320 B1 12/2001 Walski et al.
6,698,608 B2 3/2004 Parker et al.
6,789,692 B2 9/2004 Prezelin
2003/0038142 A1 2/2003 Gee
2003/0155366 A1 8/2003 Raghunathan

* cited by examiner

*Primary Examiner* — Frank Vanaman
(74) *Attorney, Agent, or Firm* — Carlson, Gaskey & Olds, P.C.

(57) ABSTRACT

A roll-out cart includes a lid and a cart body supported on wheels. The cart body is comprised of a base wall, a front wall, a rear wall, and a pair of side walls that cooperate with each other to define a cart interior. The lid is attached to the cart body with a hinge connection and is moveable between an open position to provide access to the cart interior and a closed position to prevent access to the cart interior. A latch is pivotally mounted to the lid to lock the lid in the closed position.

25 Claims, 24 Drawing Sheets

ROLL-OUT CART

RELATED APPLICATIONS

This application claims priority to U.S. Provisional Application No. 61/105,019, filed Oct. 13, 2008, and U.S. Provisional Application No. 61/167,953, filed Apr. 9, 2009.

TECHNICAL FIELD

This invention relates generally to roll-out carts, such as are used for trash or recycling.

BACKGROUND OF THE INVENTION

Known roll-out carts generally include front, rear and side walls extending upward from a perimeter of a bottom wall to define an interior. Wheels are rotatably mounted at a lower end of the rear wall. A handle extends from an upper end of the rear wall, such that the roll-out cart can be tipped back onto the wheels and pulled by the handle. A lid is hingeably connected to an upper edge of the rear wall.

Rodents or other animals often try to gain access to the contents of the carts. There have been various attempts to provide rodent-resistant lids, but the known lids have been inconvenient for the human users.

SUMMARY OF THE INVENTION

A cart includes a cart body and a lid that is pivotally connected to the cart body. A latch is pivotally mounted to the lid to lock the lid in the closed position.

In one example, the cart body is comprised of a base wall, a front wall, a rear wall, and a pair of side walls that cooperate with each other to define a cart interior. The lid is attached to the cart body with a hinge connection and is moveable between an open position to provide access to the cart interior and a closed position to prevent access to the cart interior. The latch is selectively pivotable between a latched position where the lid is securely locked to the cart body and an unlatched position where the latch disengages from the cart body to allow the lid to be moved to an open position.

In one example, the latch includes mount portions that are mounted within a flange formed within the lid.

In one example, the latch includes retaining portions that snap-fit under a flange on the front wall of the cart when in the latched position.

In one example, the latch includes a first retaining portion and a second retaining portion. The first retaining portion cooperates with the cart to hold the lid in the closed position until an unlatching force is exerted on the latch. The second retaining portion cooperates with the lid to hold the latch in an unlatched position until a re-latching force is exerted on the latch.

These and other features of the present invention can be best understood from the following specification and drawings, the following of which is a brief description.

DETAILED DESCRIPTION OF THE PREFERRED EMBODIMENT

Figure 1:
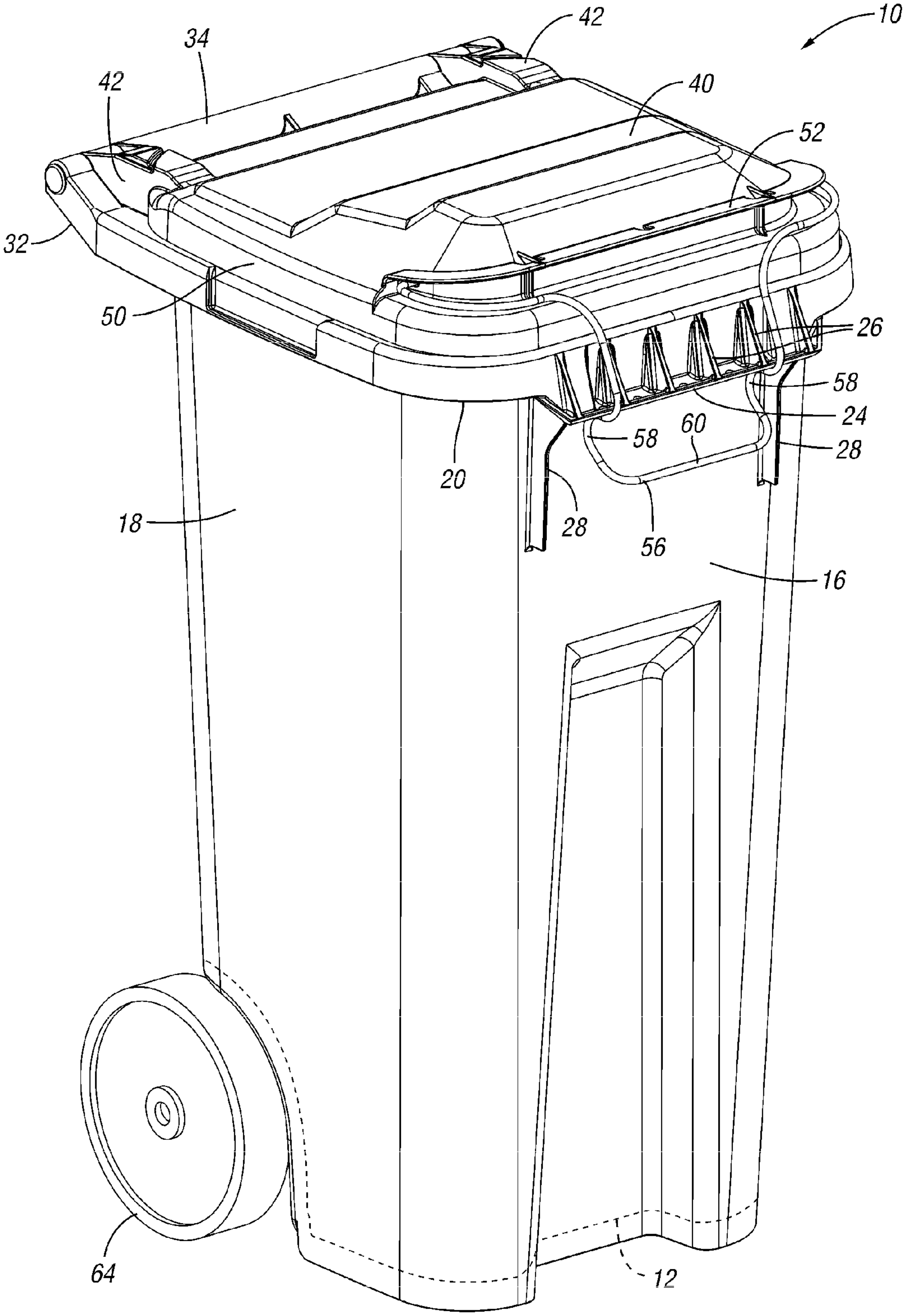
FIG. 1 is a perspective view of a roll-out cart according to one embodiment of the present invention.

FIG. 1 illustrates a roll-out cart 10 according to one embodiment of the present invention. The roll-out cart 10 includes a base wall 12, a front wall 16, opposed side walls 18 and a rear wall (not visible) extending upwardly therefrom to define a cart interior. A lip 20 protrudes outwardly and then downwardly from upper edges of the front wall 16 and side walls 18. A front flange 24 extends downwardly and outwardly from a front of the lip 20 and is reinforced by upper gussets 26 connected to the lip 20 and lower gussets 28 connected to the front wall 16. The lip 20 is continuous with a pair of supports 32 extending upwardly and rearwardly of a rear of the cart 10. A handle 34, which is used to pull the cart 10, is secured to the supports 32.

A lid 40 is hingeably secured to the handle 34 by arms 42. The lid 40 includes a peripheral flange 50 that rests on upper edges of the front wall 16 and side walls 18 when closed. An upper flange 52 protrudes forwardly from a forward end of the lid 40 and is spaced upwardly from the peripheral flange 50. The upper flange 52 acts as a handle to assist in opening the lid 40.

A latch 56 is pivotally secured to the lid 40. The latch 56 includes a pair of spaced apart retaining portions 58 that snap-fit under the front flange 24 of the cart 10. A handle portion 60 connects the two retaining portions 58.

The cart 10 may include a pair of wheels 64 at a rearward portion of the cart 10, below the handle 34. When the cart 10 is tilted, the handle 34 can be pushed or pulled to roll the cart 10 on the wheels 64.

Figure 2:
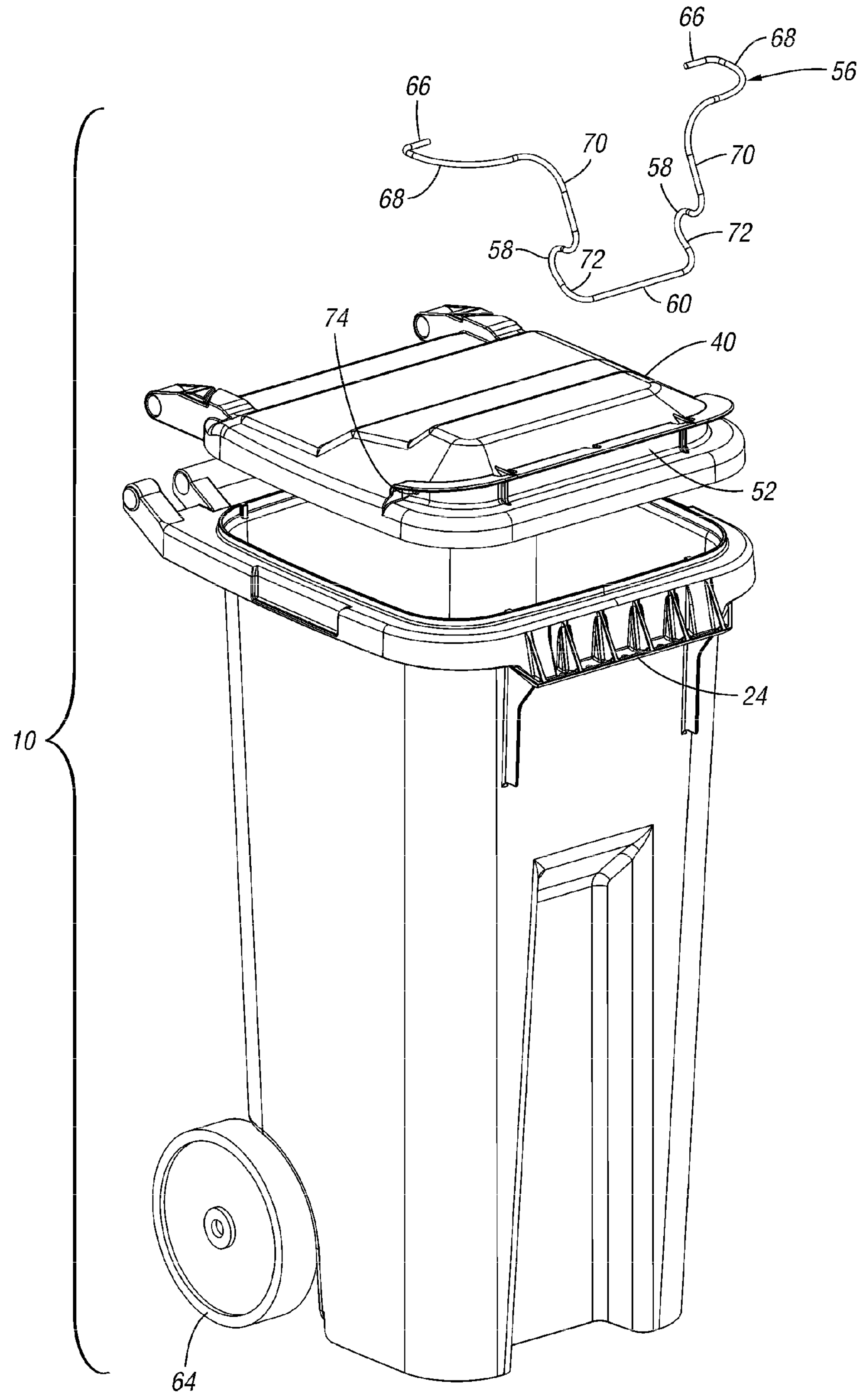
FIG. 2 is a partially exploded view of the cart of FIG. 1.

FIG. 2 is a partially exploded view of the cart 10 of FIG. 1. The latch 56 includes a pair of hinge member portions 66 protruding inwardly toward each other. Side arm portions 68 of the latch 56 extend from the hinge member portions 66 and curve inward toward one another and extend toward the front of the cart 10 (relative to the latched position). Front arm portions 70 extend forward and downward from the side arm portions 68 to the retaining portions 58, which curve inward and upward under the front flange 24 to retain the lid 40 in a closed and latched position. Forward arm portions 72 extend forward from the retaining portions 58 to the handle portion 60, which connects the two forward arm portions 72.

Figure 3:
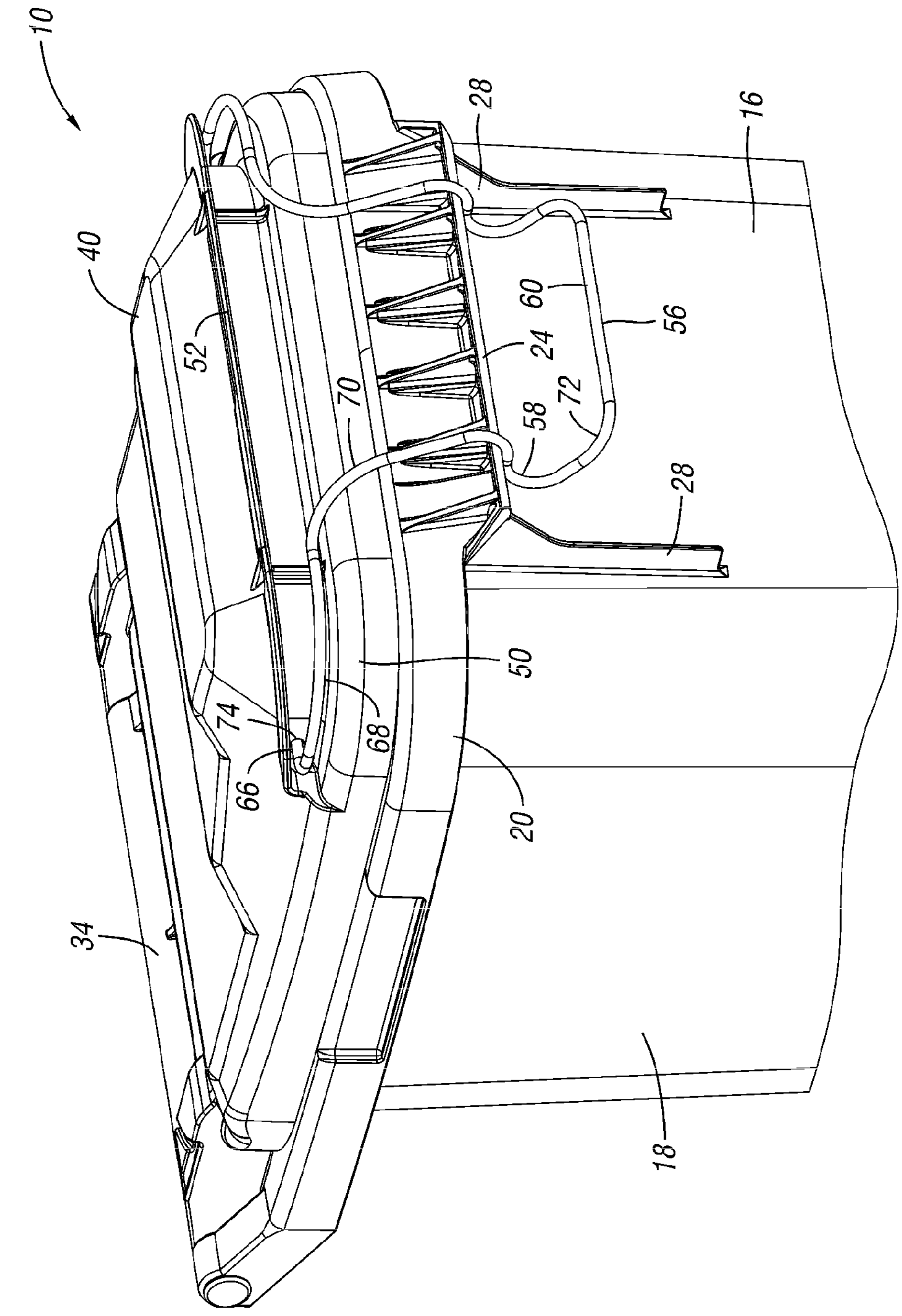
FIG. 3 is a perspective view of the cart with a latch in a latched position on the cart.
Figure 4:
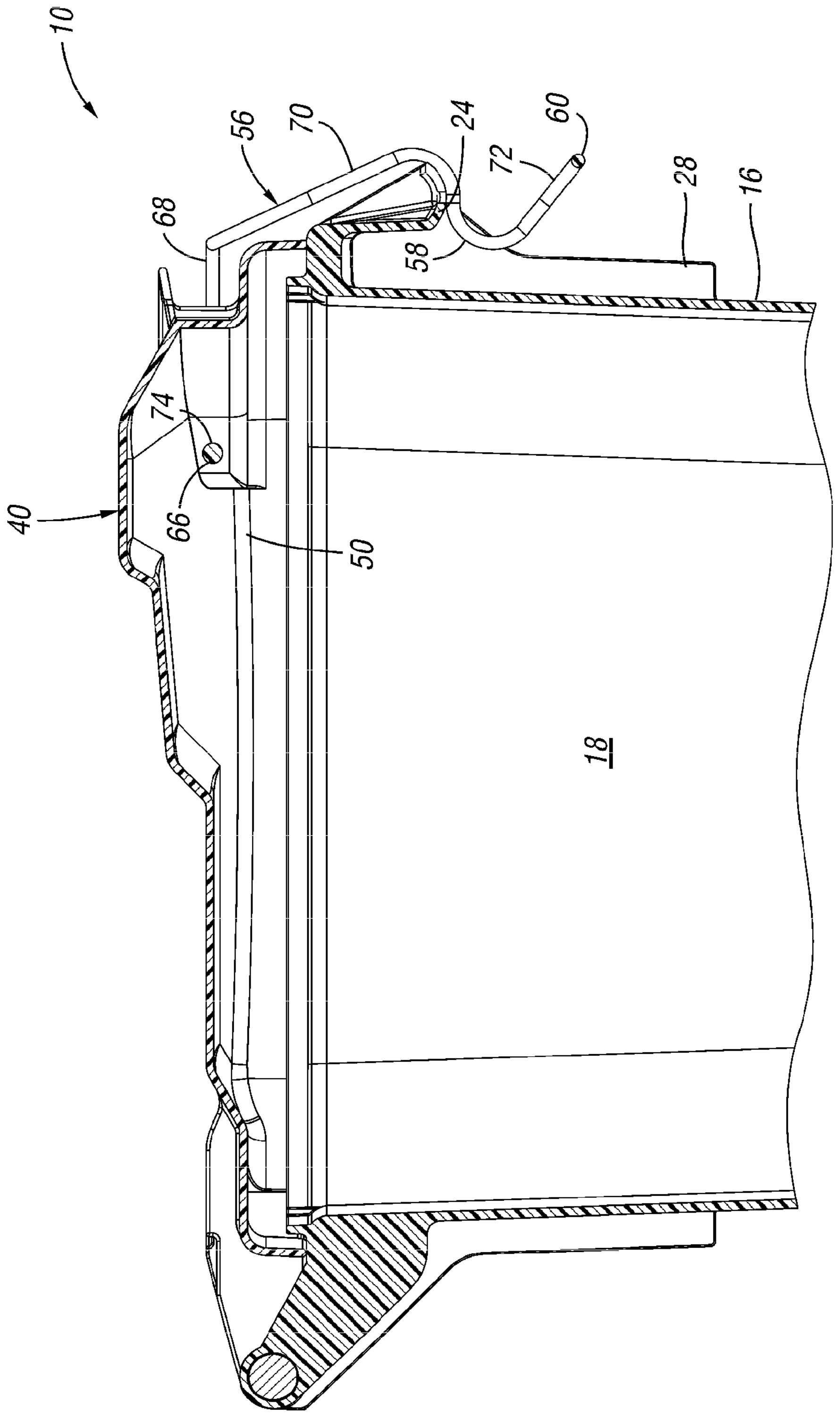
FIG. 4 is a corresponding section view of FIG. 3.

FIG. 3 is a perspective view of the cart 10 with the latch 56 in a latched position on the cart 10. FIG. 4 is a corresponding section view. Referring to FIGS. 3 and 4, the latch 56 is pivotally secured to the lid 40 by inserting the hinge member portions 66 of the latch 56 into hinge openings 74 in the lid 40. The side arm portions 68 extend over the peripheral flange 50 of the lid 40. The front arm portions 70 extend outward and then downward over the front flange 24. The retaining portions 58 protrude under the front flange 24 to retain the lid 40 in a latched, closed position. The forward arm portions 72 extend forward from the retaining portions 58 to the handle portion 60, which connects the two forward arm portions 72. The latch 56 may be made from steel, aluminum, plastic (extruded, injection molded, etc) and could be a solid rod or hollow rod to provide a resilient, deformable shape. An optional handle (not shown) could be provided over the handle portion 60 to provide a larger handle. The optional handle could also provide the retaining portions.

Figure 5:
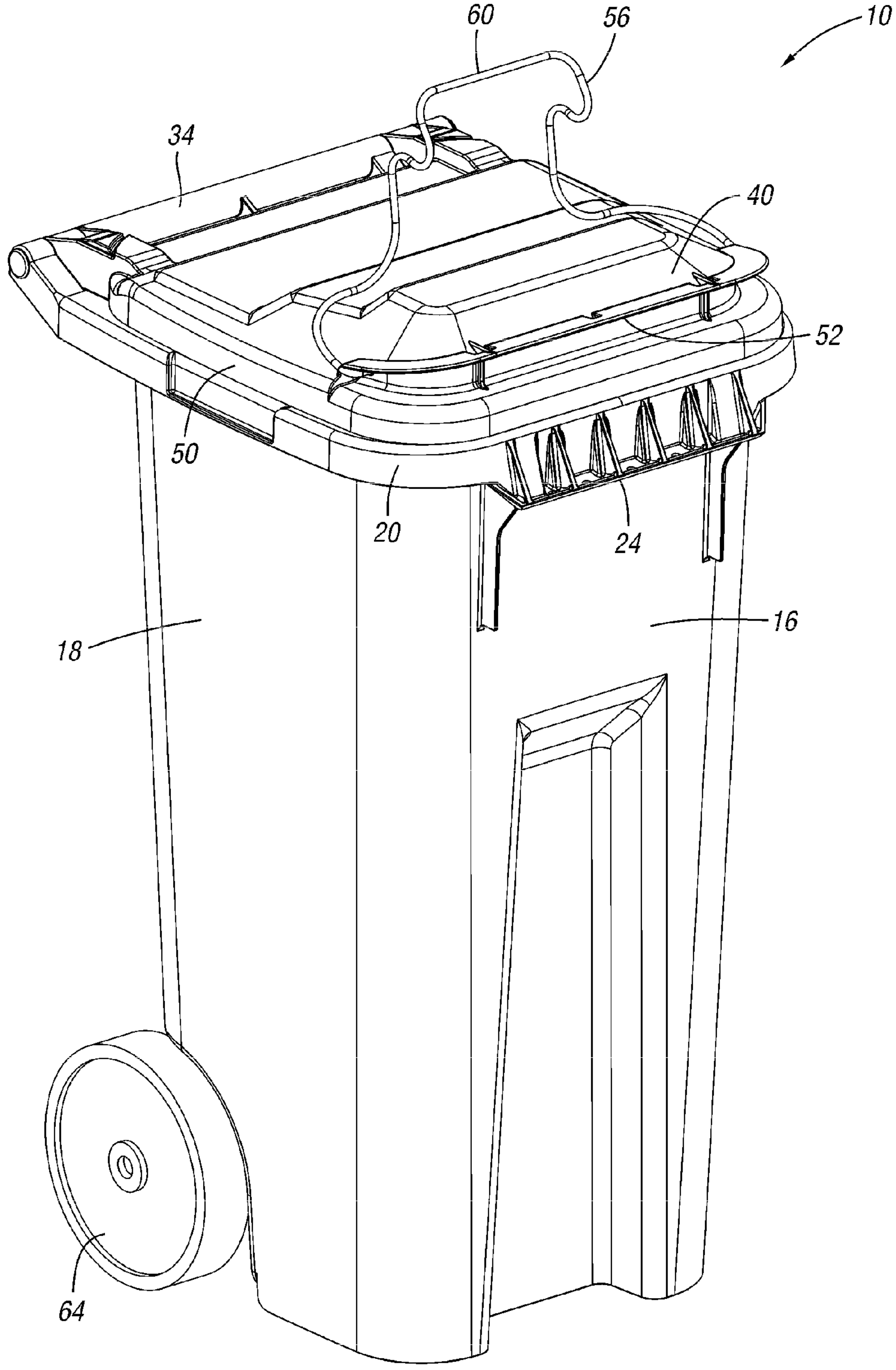
FIG. 5 is a perspective view of the cart of FIG. 1 with the latch in an unlatched position.
Figure 6:
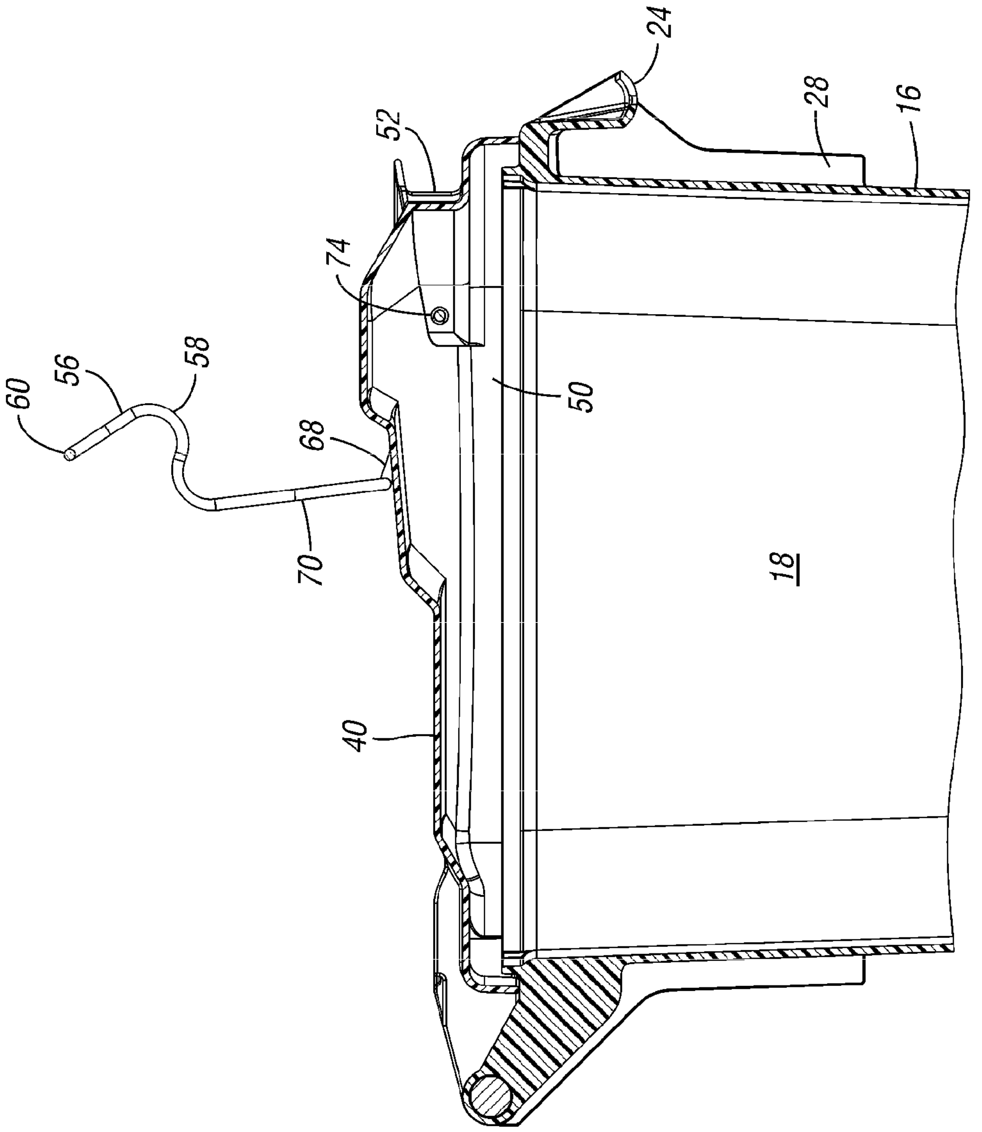
FIG. 6 is a corresponding section view of FIG. 5.
Figure 7:
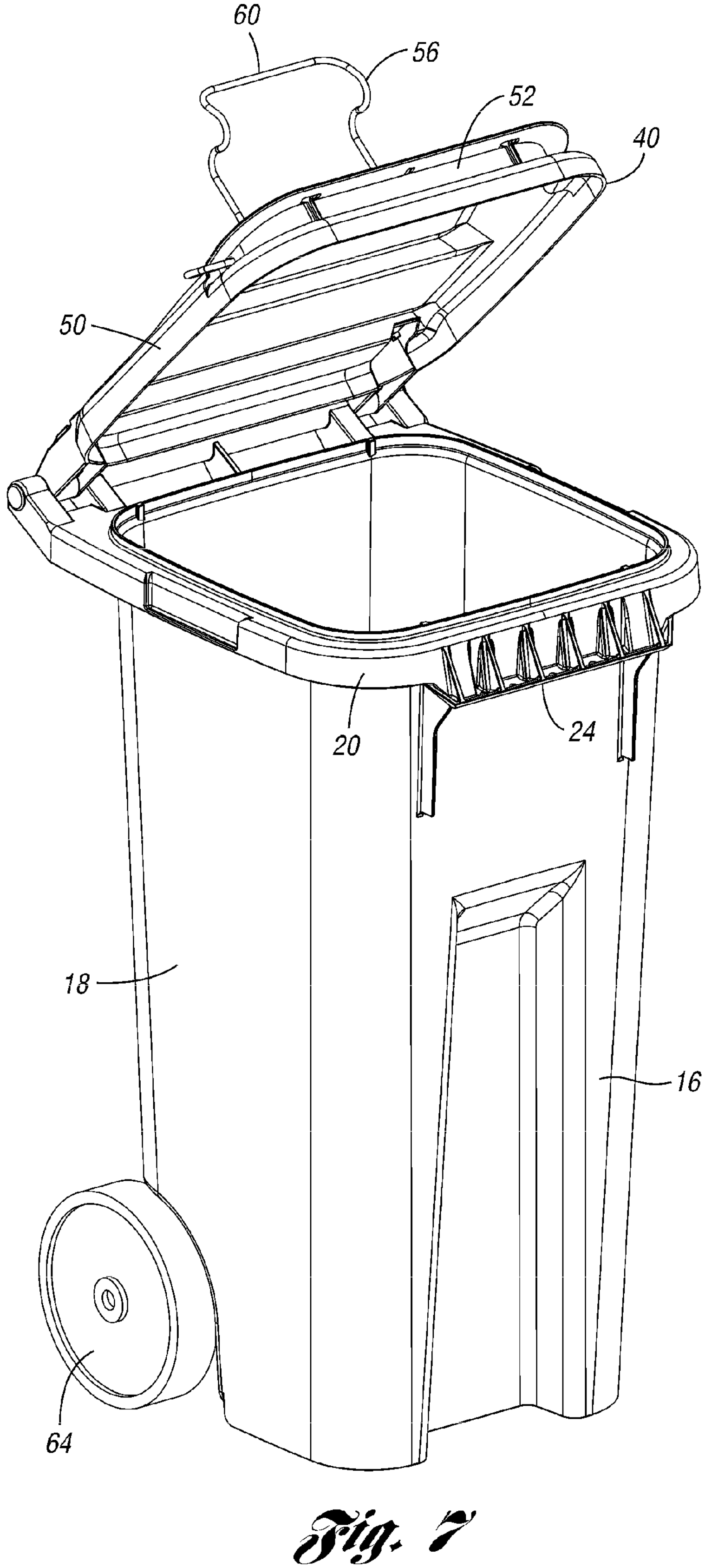
FIG. 7 is a perspective view of the cart of FIG. 5 as the lid is moved toward an open position.
Figure 8:
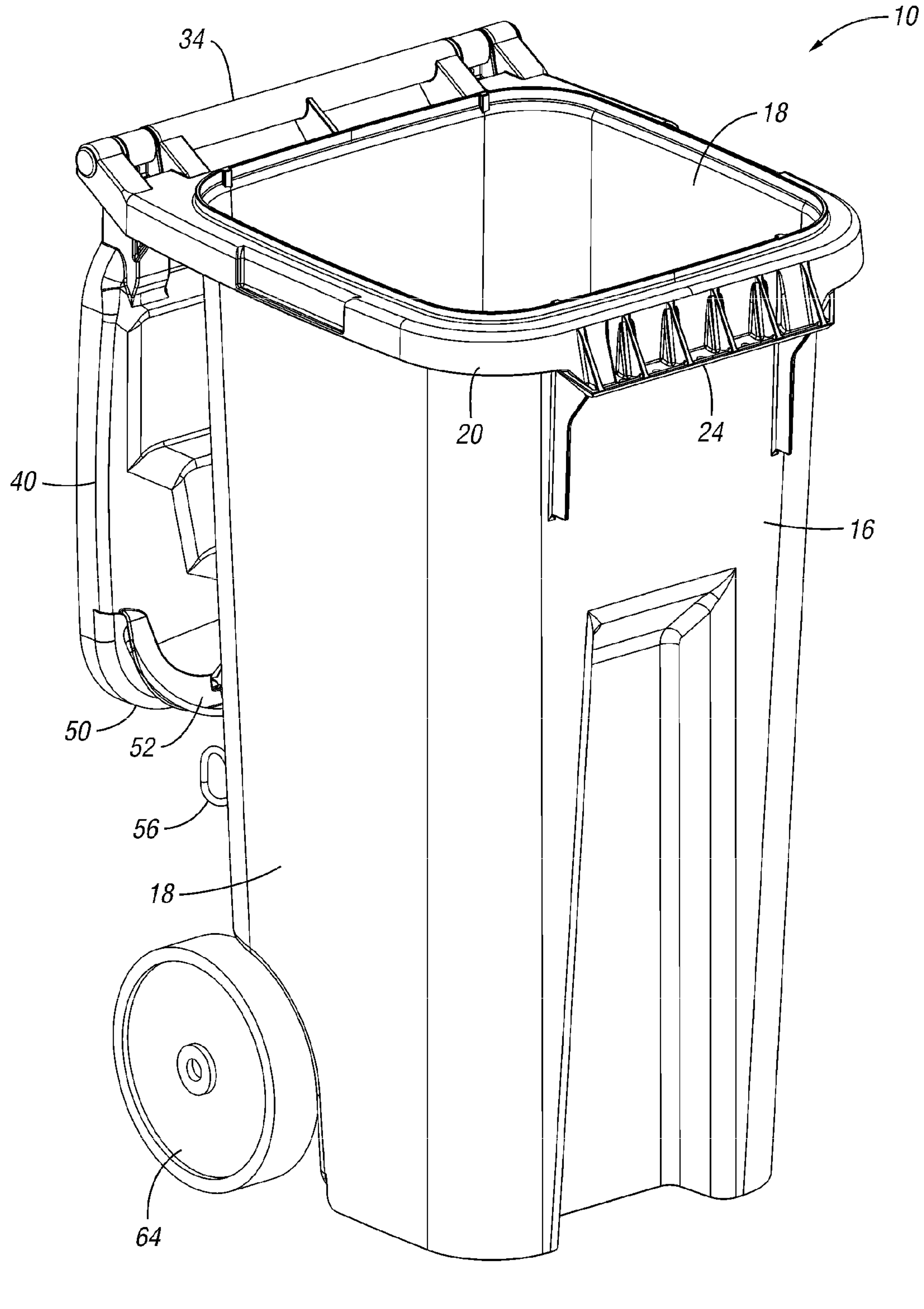
FIG. 8 is a perspective view of the cart of FIG. 5 with the lid in a fully open position.

To release the latch 56, the user can pull downward and outward on the handle portion 60. The user can release the latch 56 with one hand, such as by leverage off the thumb on the front flange 24. This pulls the retaining portions 58 out from under the front flange 24. As the latch 56 is pivoted upwardly, as shown in FIGS. 5 and 6, the latch 56 flexes outwardly over the upper flange 52 of the lid 40, but the hinge member portions 66 stay in the openings 74. As the user continues to lift handle portion 60, the lid 40 opens to expose the interior of the cart 10, as shown in FIG. 7. The lid 40 can be opened further (using handle portion 60 or otherwise) until it hangs down from the handle 34 as shown in FIG. 8. Thus, the latch 56 can be operated with one hand and the lid 40 can be opened all with one motion and without changing grips or moving the hand.

To re-latch the lid 40, the lid 40 is closed (optionally, by using handle portion 60). The latch 56 is then pivoted downwardly over the front flange 24 until the retaining portions 58 snap-fit under the front flange 24, thereby retaining the lid 40 in a closed position.

Several benefits are achieved. First, as discussed above, the latch 56 and lid 40 can be fully operated with one hand in a single motion without changing grips. Further, because the latch 56 is pivotally attached to the lid 40, rather than the body of the cart 10, there are no holes through the side walls 18.

Optionally, in areas where the carts 10 must be unlatched by the home owners before pickup, the position of the latch 56 is visible to route drivers, who can tell if the latch 56 is latched or not based upon whether it is in the up position (FIGS. 5 and 6). The latch 56 could be painted red to enhance visibility.

FIGS. 9-15 show another example of a latch 156. Latch 156 is similar to latch 56; however, the hinge member portions comprise a connection portion 180 that allows the latch 156 and associated handle portion 160 to be firmly held in an unlocked/unlatched position. This achieves an additional benefit of preventing the latch 156 from interfering with dumping of refuse into a garbage truck, which may occur with a more loosely hinged configuration such as that described above.

The latch 156 includes a pair of spaced apart retaining portions 158 that snap-fit under the front flange 24 of the cart 10. The handle portion 160 connects the two retaining portions 158. The latch 156 also includes side arm portions 168 that extend from the connection portion 180 toward the front of the cart 10. Front arm portions 170 curve and extend forward and downward from the side arm portions 168 to the retaining portions 158, which curve inward and upward under the front flange 24 to retain the lid 40 in a closed position. Forward arm portions 172 extend forward from the retaining portions 158 to the handle portion 160, which connects the two forward arm portions 172.

Figure 9:
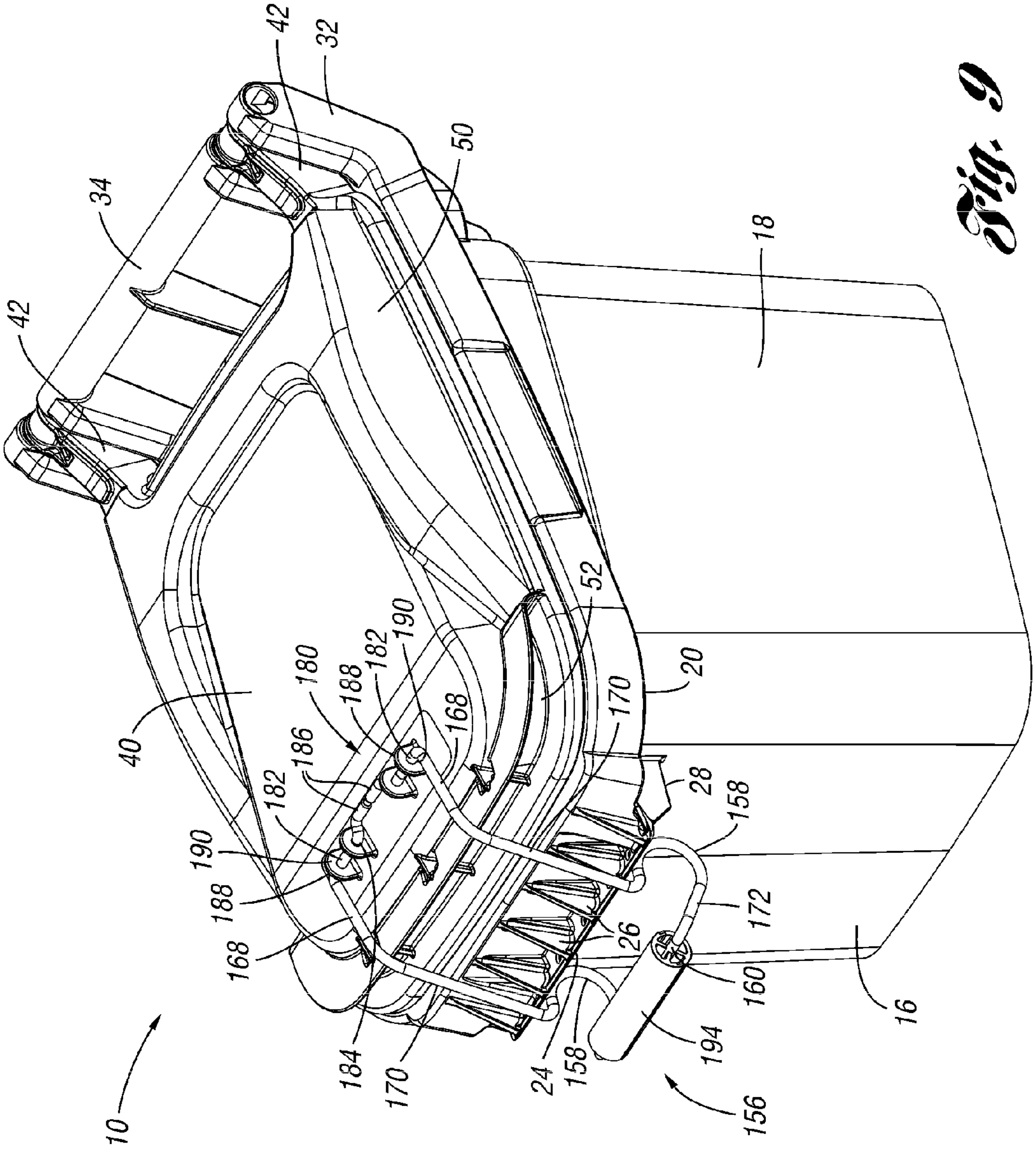
FIG. 9 is an isometric view of another example of a latch where the latch is in a latched position.

The connection portion 180 secures the latch 156 to the lid 40 adjacent the upper flange 52 near a front edge of the cart 10. The connection portion 180 includes inward arm portions 182 that extend from respective side arm portions 168 inward toward each other. Transition portions 184 curve inwardly and rearwardly from the inward arm portions 182. Base portions 186 extend inwardly toward each other from the transition portions 184. The base portions 186 and the inward arm portions 182 are generally linear portions that extend in a direction across a width of the cart 10. In one example, the inward arm portions 182 extend in a direction that is generally parallel to the base portion 186, and which is generally parallel to the handle portion 160. Due to the curved transition portions 184, the inward arm portions 182 are offset from the base portions 186 in a direction toward the front of the cart 10 when in the locked position as shown in FIG. 9. When the latch 156 is in the unlocked position (FIG. 12) the base portions 186 are offset from the inward arm portions 182 in a direction toward the front of the cart 10.

The lid 40 includes upwardly extending mounting bosses 188 with openings 190 that receive the inward arm portions 182. In the example shown, two (2) mounting bosses 188 (axially spaced part from each other) are associated with each inward arm portion 182; however, additional mounting bosses could also be used, or only one mounting boss 188 may be required.

FIG. 9 is an isometric view showing the latch 156 in a latched position with the retaining portions 158 fitting in gripping engagement underneath the front flange 24. In this example, the handle portion 160 includes an enlargement feature 194 that further facilitates unlatching and opening the lip 40. The enlargement feature 194 could be an integrally formed or molded portion of the handle portion itself, or could comprises a separate handle component that is attached to the handle portion 160.

Figure 10:
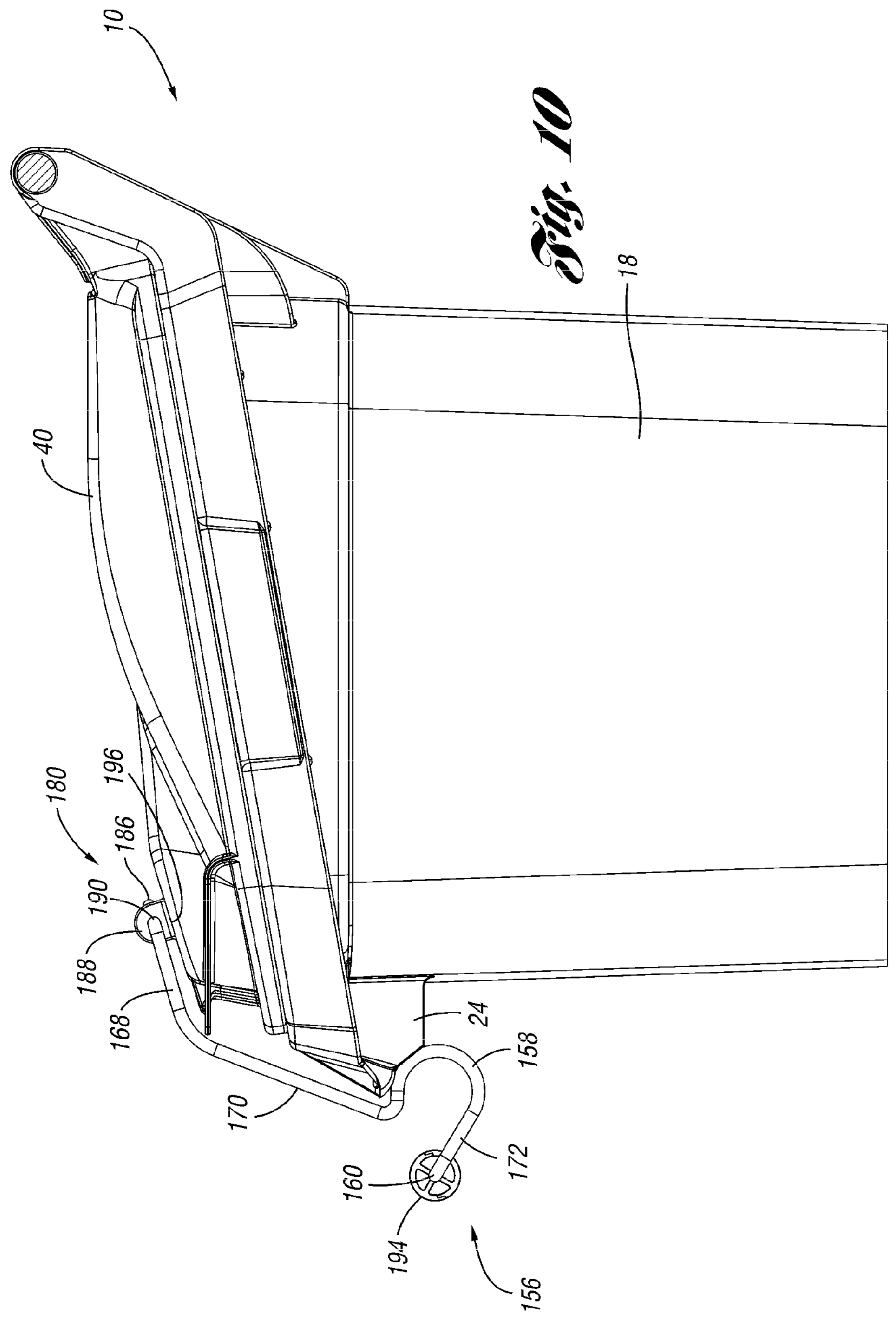
FIG. 10 is a side view of the cart of FIG. 9 showing the latch in the latched position.
Figure 11:
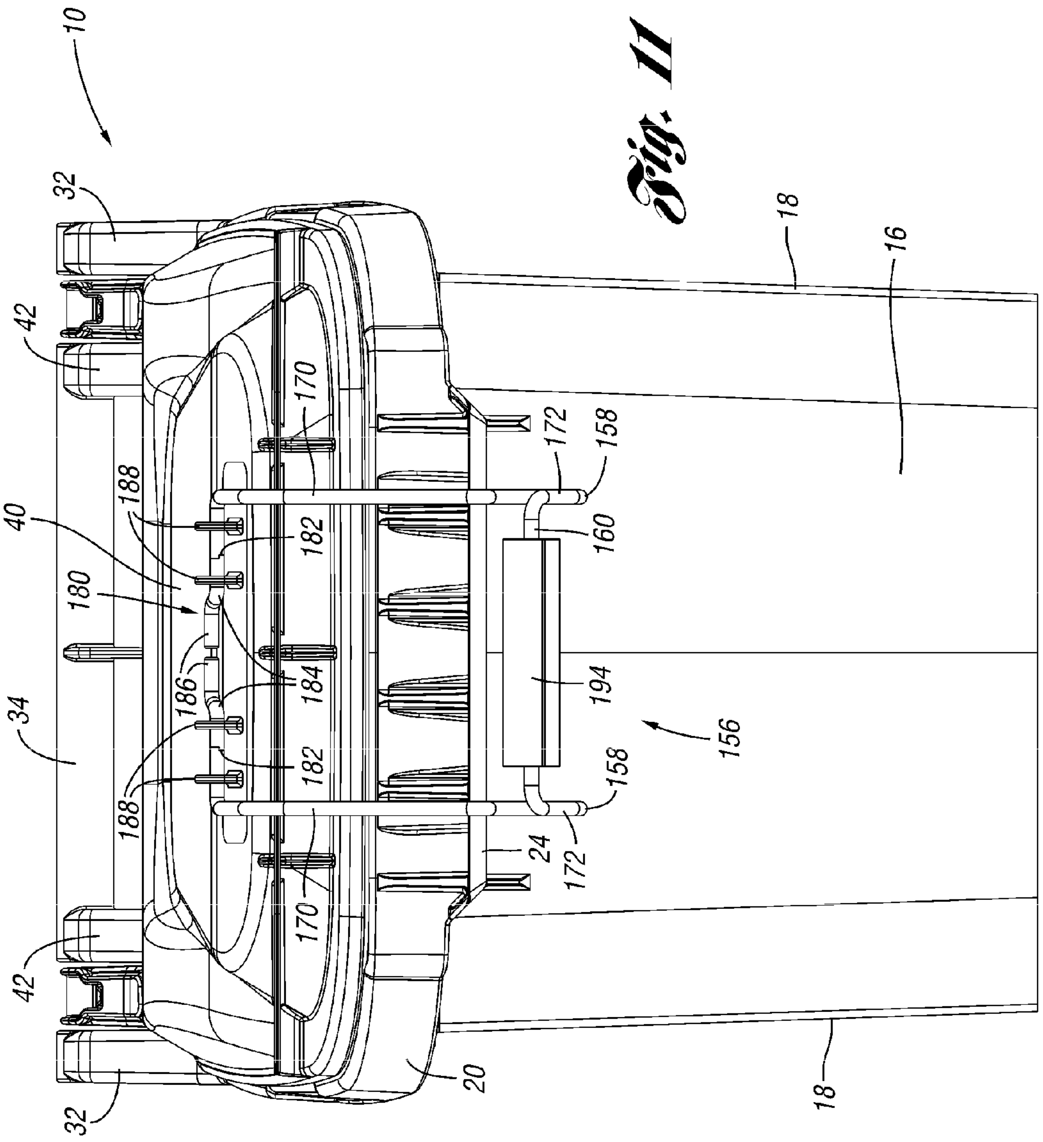
FIG. 11 is a front view of the cart of FIG. 9 showing the latch in the latched position.

FIG. 10 is a side view of the cart 10 showing the latch 156 in the latched position. FIG. 11 is a front view of the cart 10 showing the latch 156 in the latched position.

Figure 12:
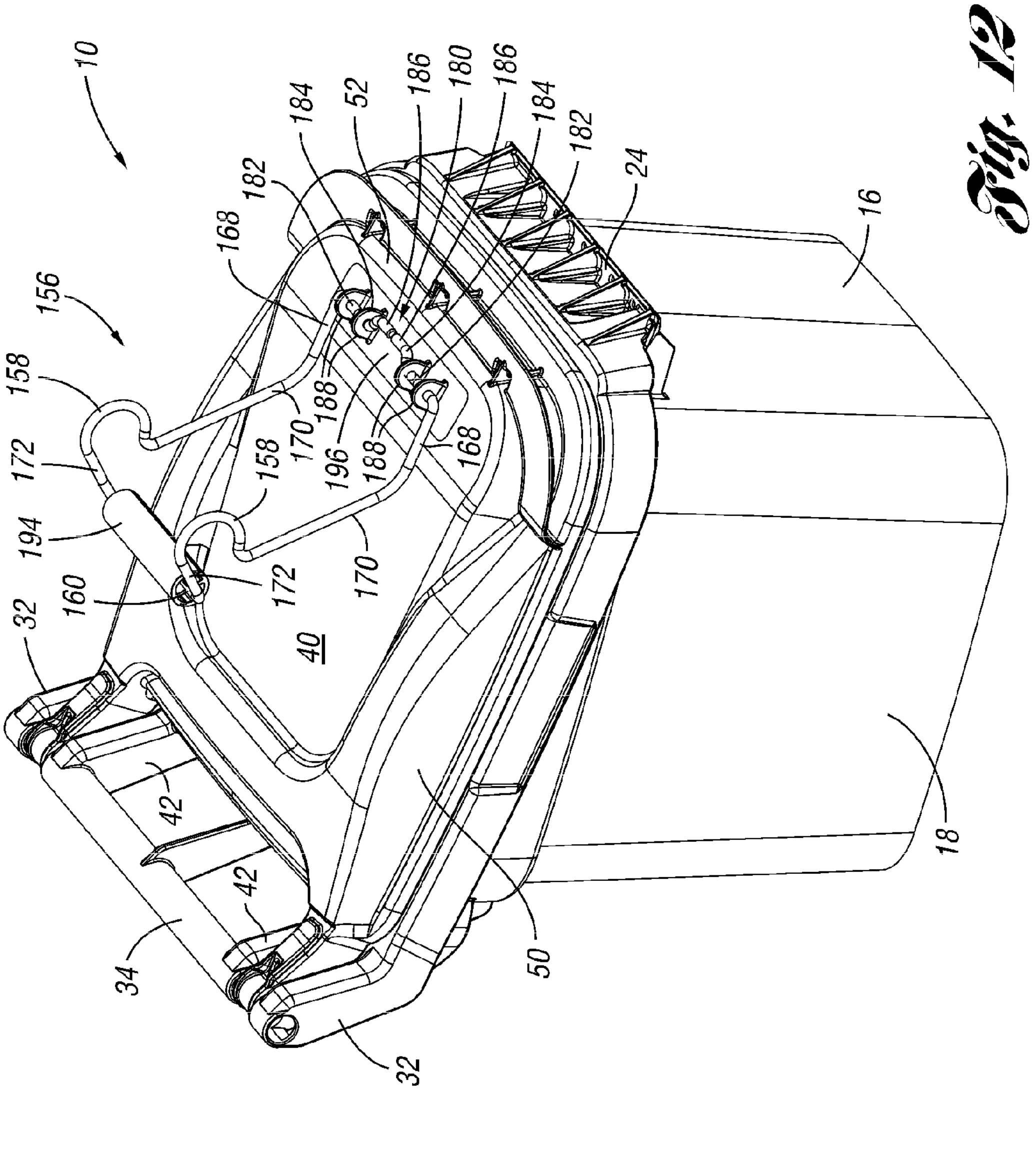
FIG. 12 shows an isometric view of the cart of FIG. 9 with the latch in an unlatched position.
Figure 13:
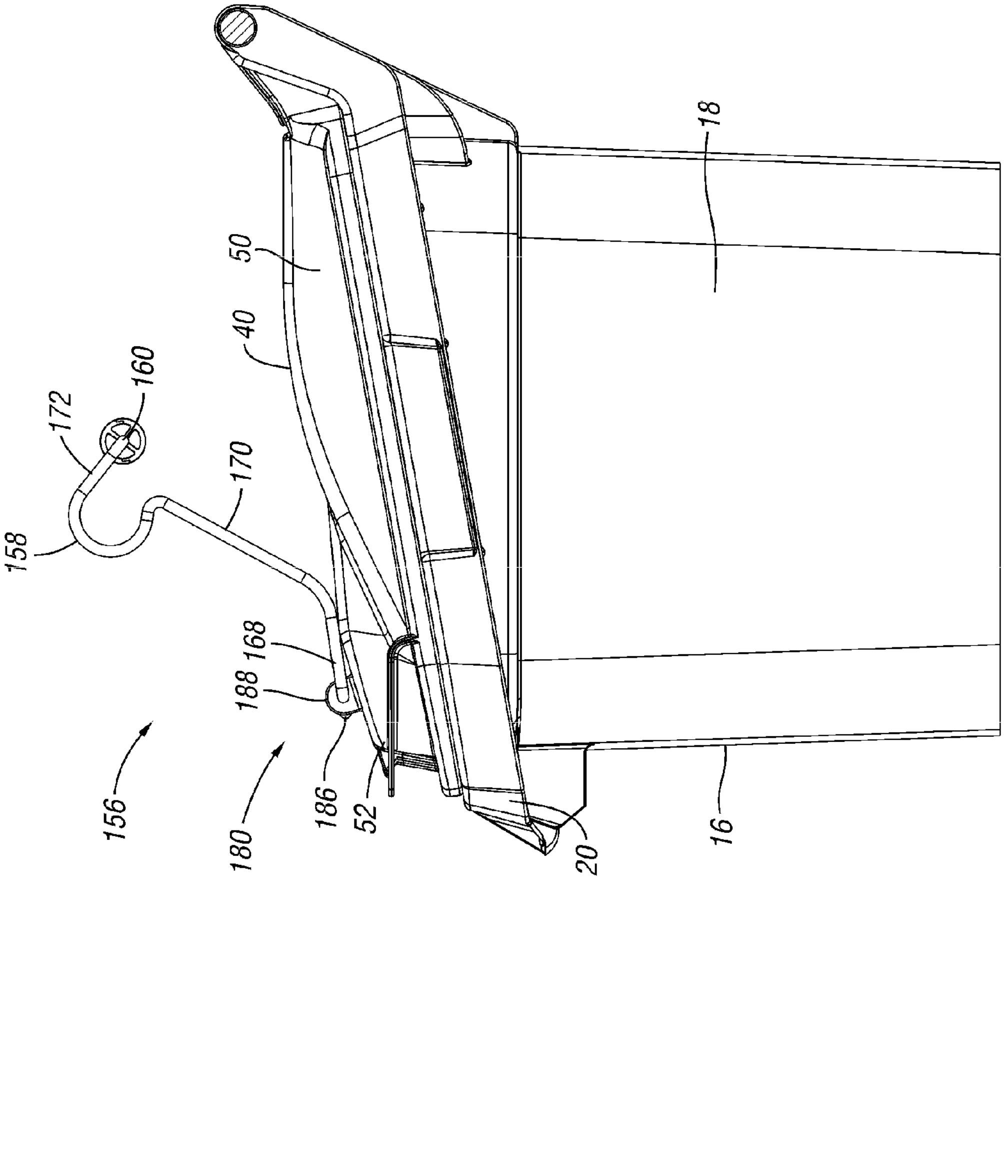
FIG. 13 is a side view of the cart of FIG. 9 with the latch in the unlatched position.
Figure 14:
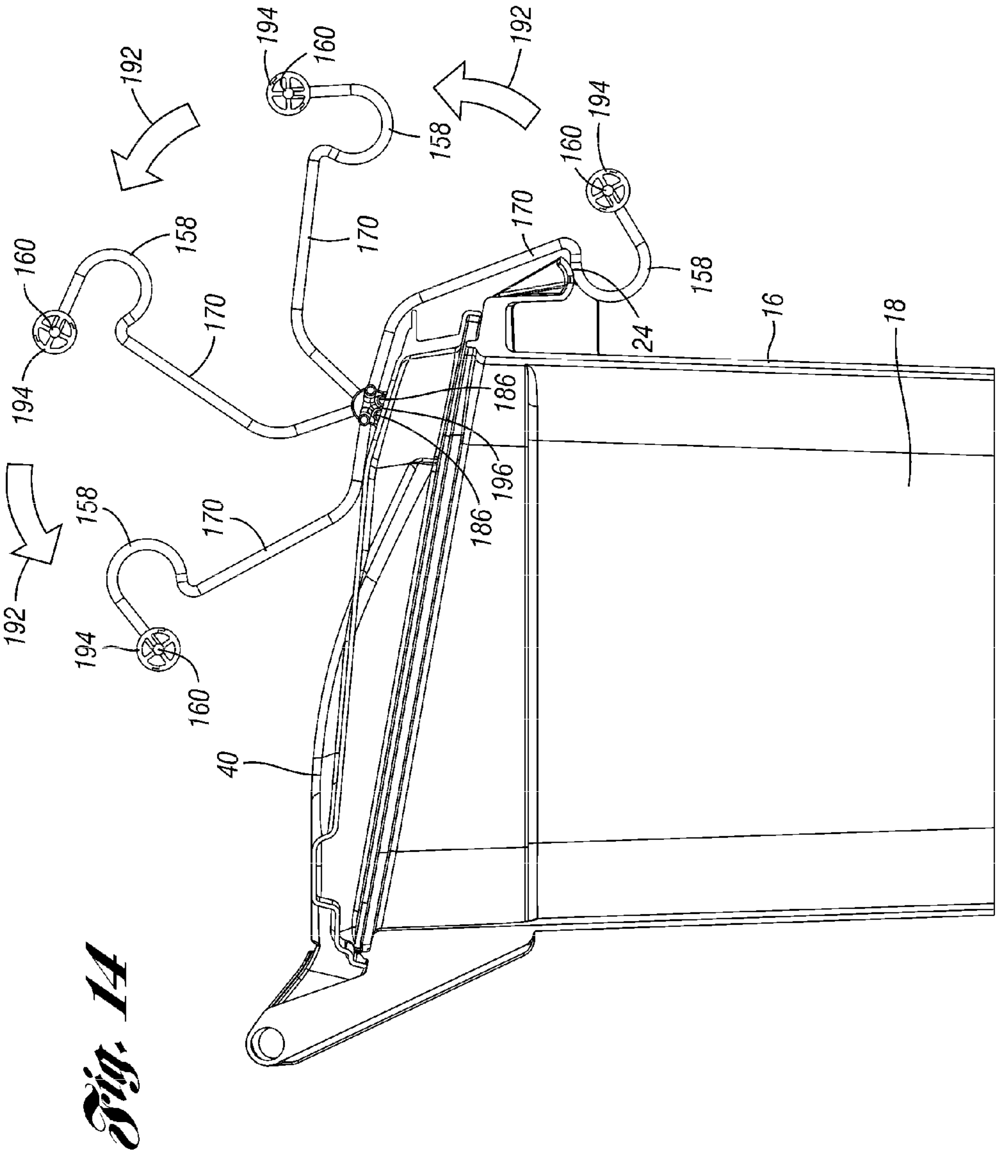
FIG. 14 is a side view of the cart of FIG. 9 showing the latch moving along an unlocking path.
Figure 15:
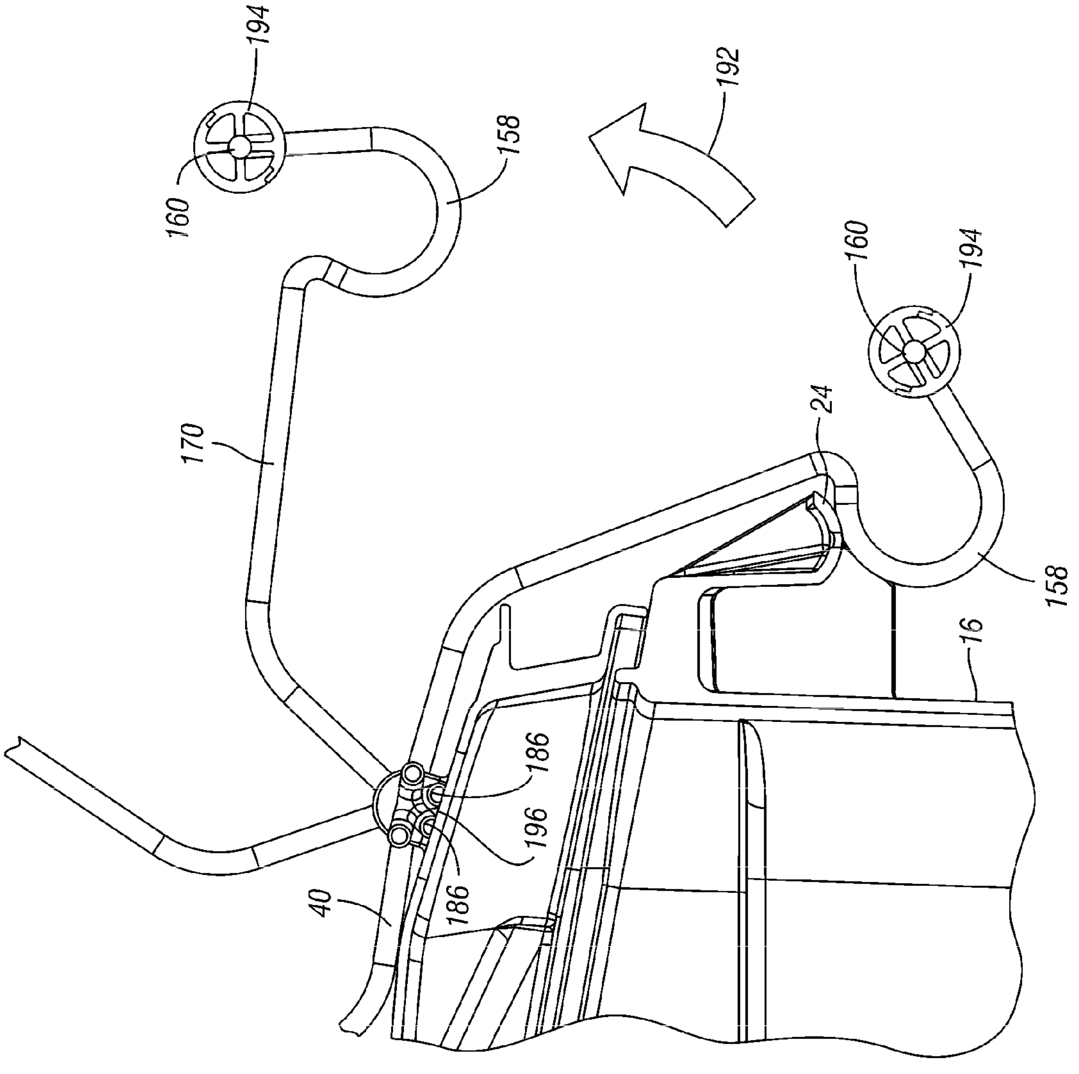
FIG. 15 is an enlarged sectioned view of the latch of FIG. 14 during movement along the unlocking path.

FIG. 12 shows an isometric view of the latch 156 in an unlocked position. FIG. 13 is a side view of the cart 10 with the latch 156 in the unlocked position. As the latch 156 is unlatched, the latch 156 moves along an unlocking path 192 as indicated in FIG. 14. FIG. 15 provides an enlarged sectioned view of the latch 156 during movement along the unlocking path 192.

Due to the offset between the base portions 186 and the inward arm portions 182, as the latch 156 moves along the unlocking path 192, the base portions 186 react against an upper surface 196 of the lid 40 in a resilient manner such that the a biasing force holds the latch 156 in the unlocked position once moved to the final unlocked position as shown in FIG. 12. The latch 156 and associated handle portion 160 remain in this position until a force is exerted on the handle portion 160 to return the latch 156 to the latched position as shown in FIG. 9.

FIGS. 14-15 appear to show that the base portions 186 are going through, i.e. passing into and out of, the lid itself; however, the base portions 186 are merely bending or deflecting against the upper surface 196 of the lid 40. As discussed above, the latch 156 (including the base portions 186) is made from a material that provides a resilient, deformable shape. Thus, this resilient material deflects and bends during movement of latch 156 along the unlocking path 192 which generates the biasing force that holds the handle portion 160 of the latch in the unlatched position.

FIGS. 16-24 show another example of a latch 256. Latch 256 is similar to latch 156; however, latch 256 includes modified connection portion 280 that allows the latch 256 and associated handle portion 260 to be firmly held in an unlocked/unlatched position. This achieves the additional benefit of preventing the latch 256 from potential contact interference with garbage during cart dumping operations as that described above.

The latch 256 includes a pair of spaced apart retaining portions 258 that snap-fit under the front flange 24 of the cart 10. The handle portion 260 connects the two retaining portions 258. The latch 256 also includes side arm portions 268 that extend from the connection portion 280 toward the front of the cart 10. Front arm portions 270 curve and extend forward and downward from the side arm portions 268 to the retaining portions 258, which curve inward and upward under the front flange 24 to retain the lid 40 in a closed, latched, and locked position. Forward arm portions 272 extend forward from the retaining portions 258 to the handle portion 260, which connects the two forward arm portions 272.

Figure 19:
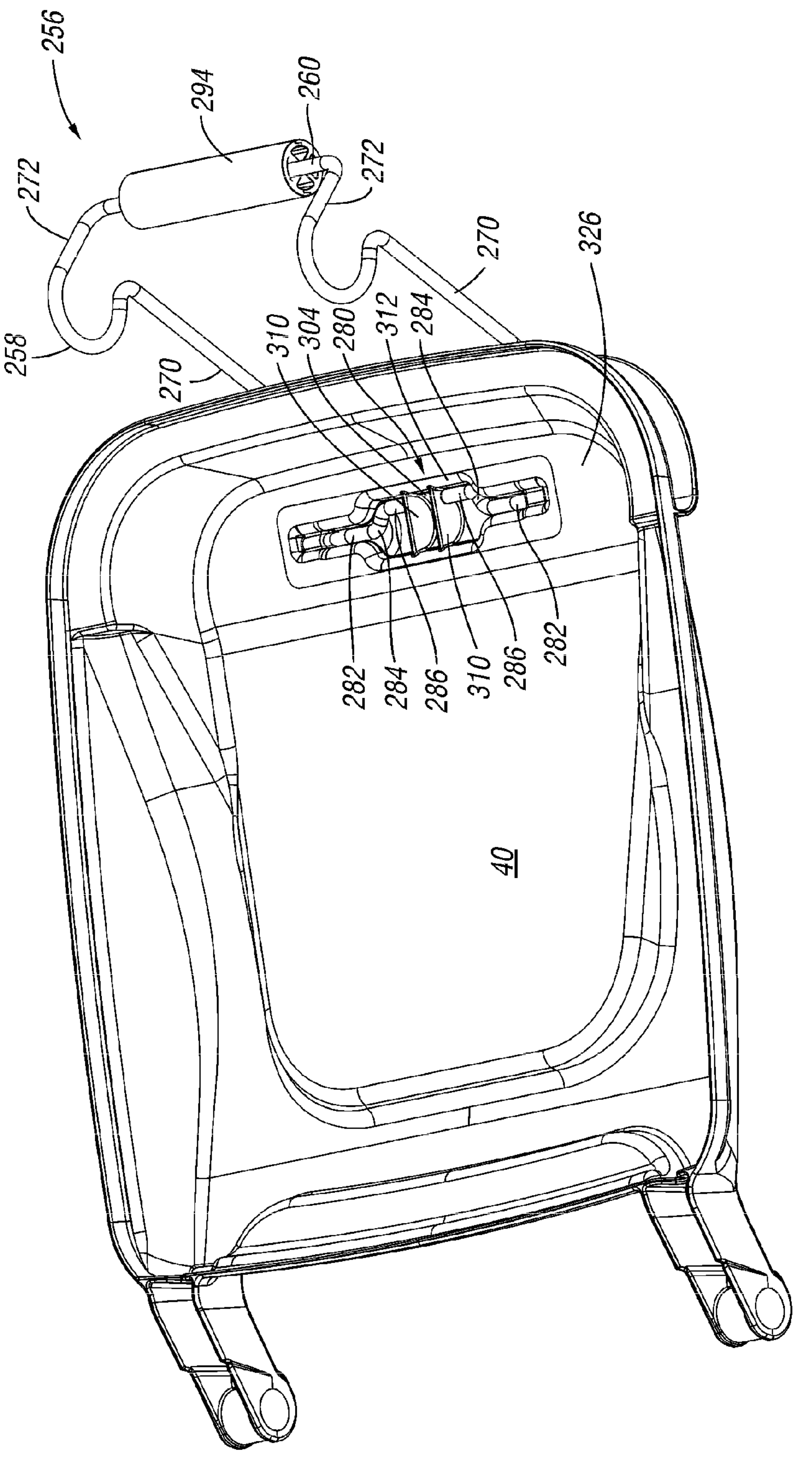
FIG. 19 shows a bottom isometric view of a lid of the cart of FIG. 16 with the latch in a locked position.
Figure 22:
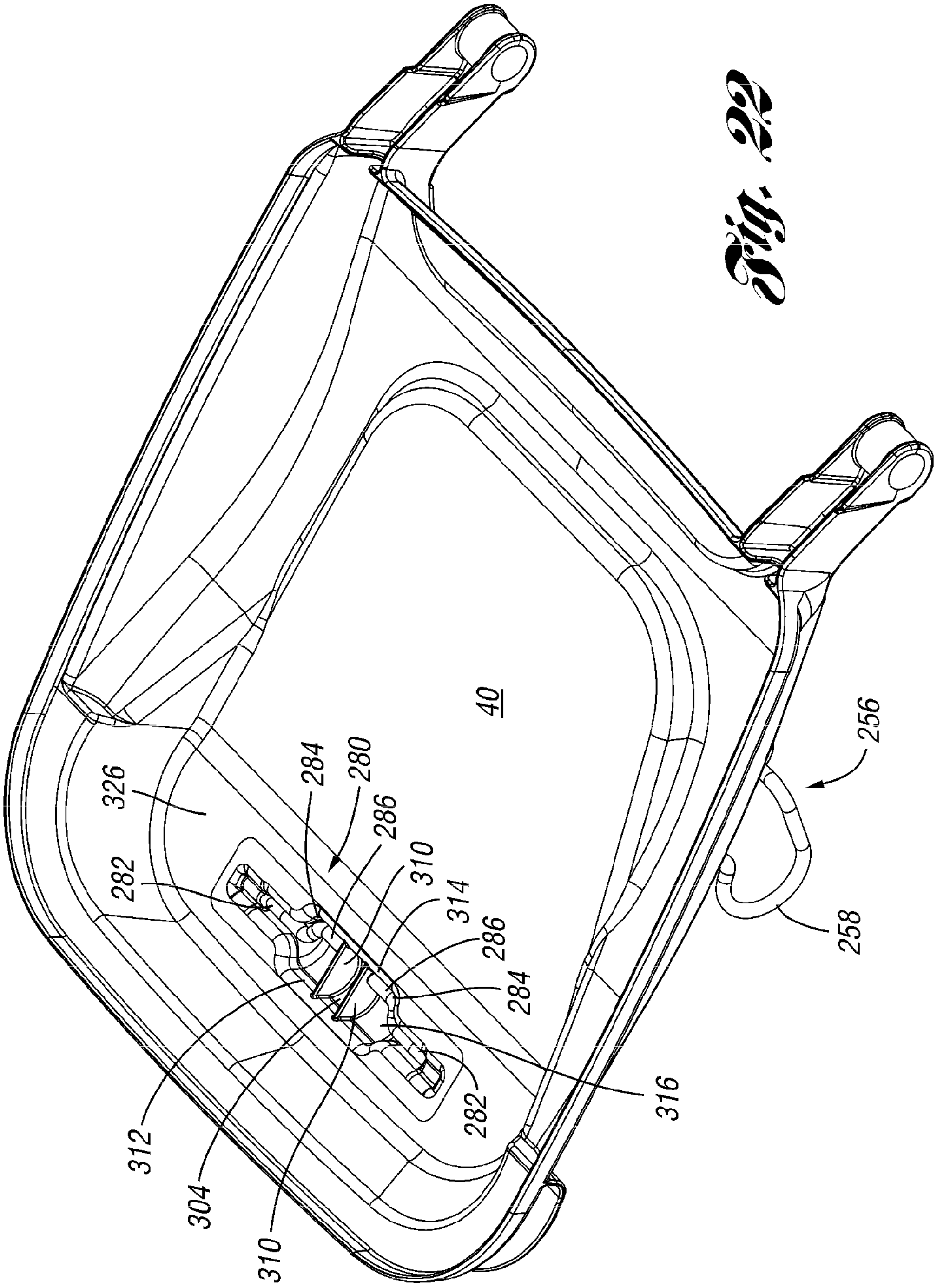
FIG. 22 shows a bottom isometric view of the lid of the cart of FIG. 16 with the latch in an unlatched position.

The connection portion 280 secures the latch 256 to the lid 40 adjacent the upper flange 52 near a front edge of the cart 10. The connection portion 280 includes inward arm portions 282 that extend from respective side arm portions 268 inward toward each other. Transition portions 284 curve inwardly and forwardly from the inward arm portions 282 when in the latched position (FIG. 19) and curve inwardly and rearwardly from the inward arm portion 282 when in the unlatched position (FIG. 22). Base portions 286 (FIGS. 19 and 22) extend inwardly toward each other from the transition portions 284. The base portions 286 and the inward arm portions 282 are generally linear portions that extend in a direction across a width of the cart 10. In one example, the inward arm portions 282 extend in a direction that is generally parallel to the base portions 286, and which is generally parallel to the handle portion 160. Due to the curved transition portions 284, the base portions 286 are offset from the inward arm portions 282 in a direction toward the front of the cart 10 when in the locked position (FIG. 19). When in the unlocked position, the inward arm portions 282 are offset from the base portions 286 in a direction toward the front of the cart 10 (FIG. 22).

The lid 40 includes a housing portion 300 (FIG. 16) that extends upwardly from an upper surface 302 of the lid 40, and which forms a corresponding recess 304 (FIGS. 19 and 22) in a bottom surface 326 of the lid 40. The housing portion 300 includes reduced portions 306 at opposing ends that including openings 308 that receive the inward arm portions 282. The reduced portions 306 transition into a larger central area that houses the base portions 286 as shown in FIGS. 19 and 22.

As shown in FIGS. 19 and 22, located within the recess 304 are gussets 310 that abut against distal ends of the base portions 286. These gussets 310 are axially spaced apart from each other and serve to prevent the base portions 286 from moving too far inwardly, which due to the inward arm portions 282 could prevent the latch from rotating.

Figure 16:
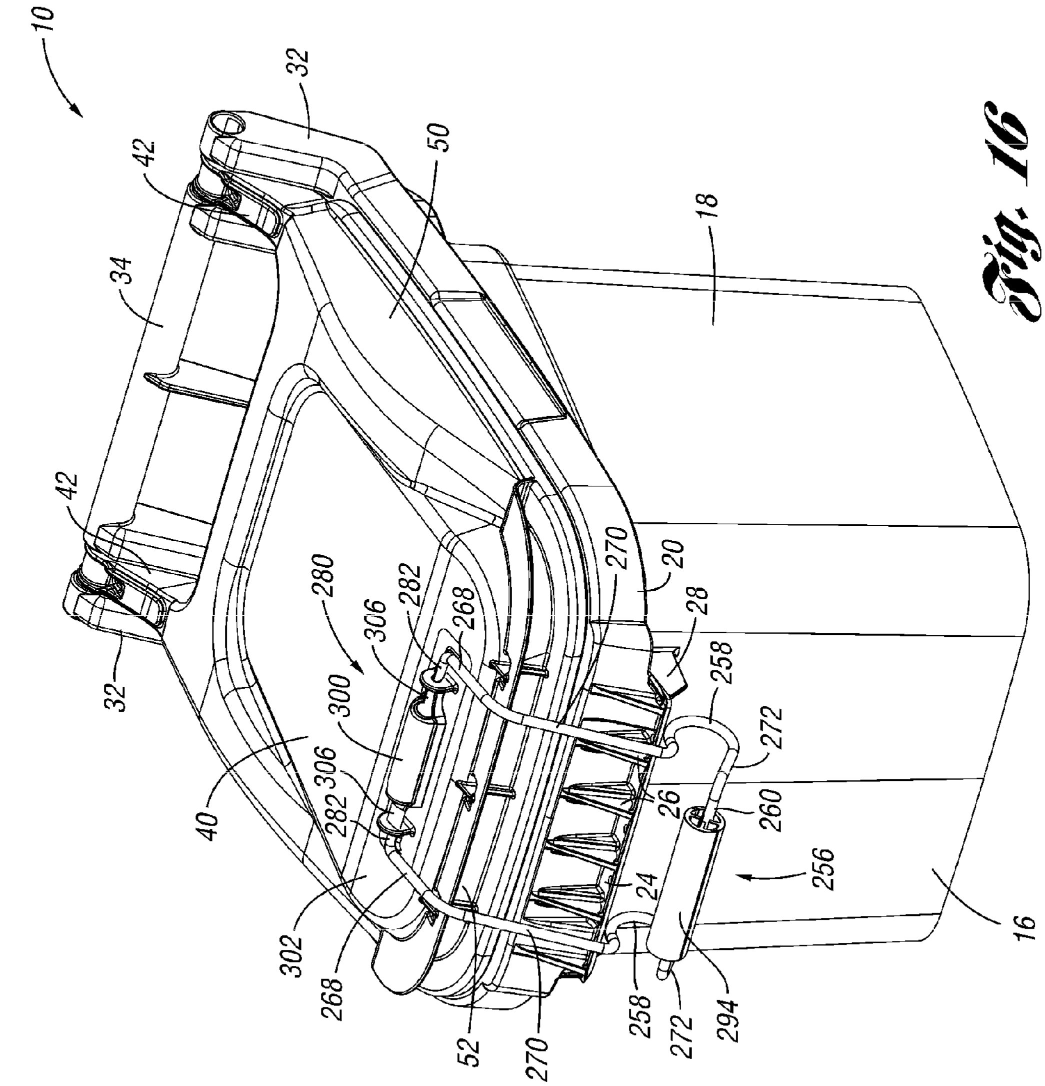
FIG. 16 is an isometric view of another example of a latch where the latch is in a latched position.

FIG. 16 is an isometric view showing the latch 256 in a latched position with the retaining portions 258 fitting in gripping engagement underneath the front flange 24. In this example, the handle portion 260 includes an enlargement feature 294 as described above.

Figure 17:
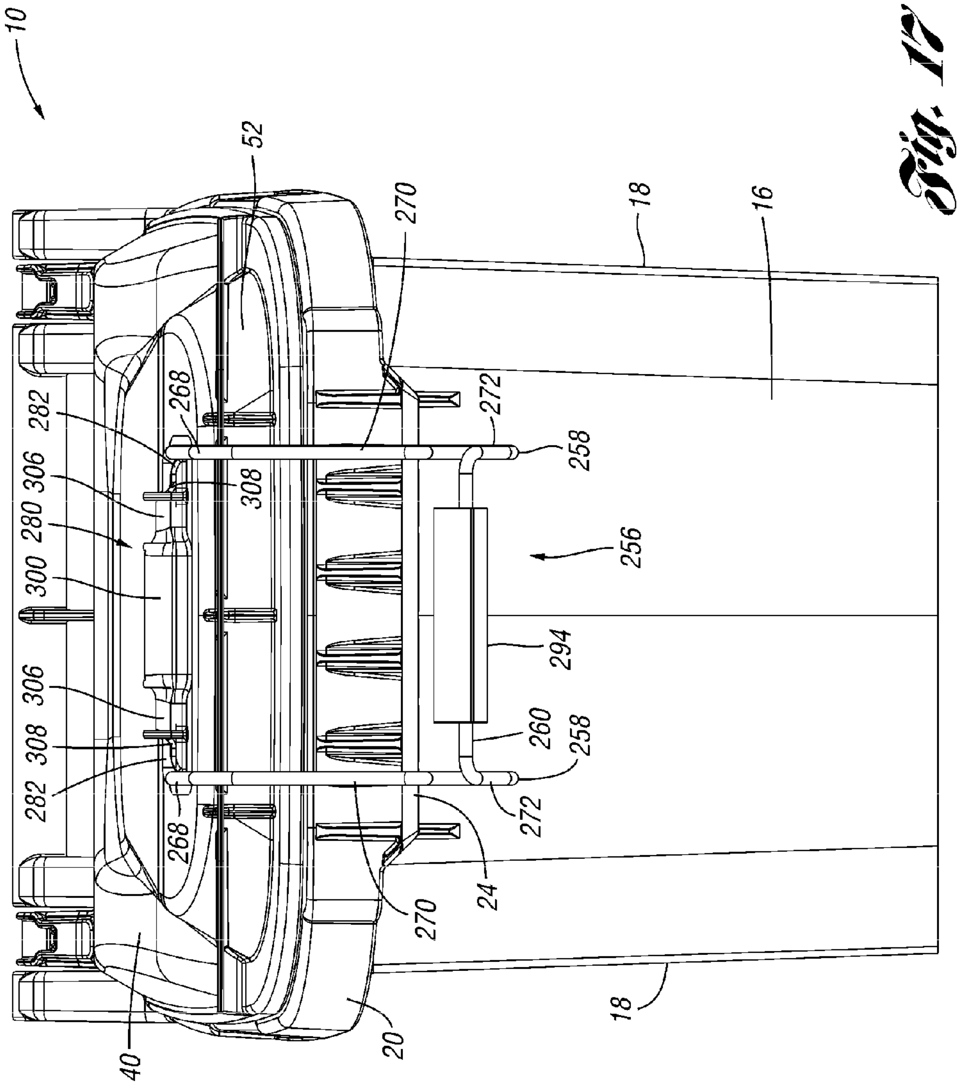
FIG. 17 is a front view of the cart of FIG. 16 showing the latch in the latched position.
Figure 18:
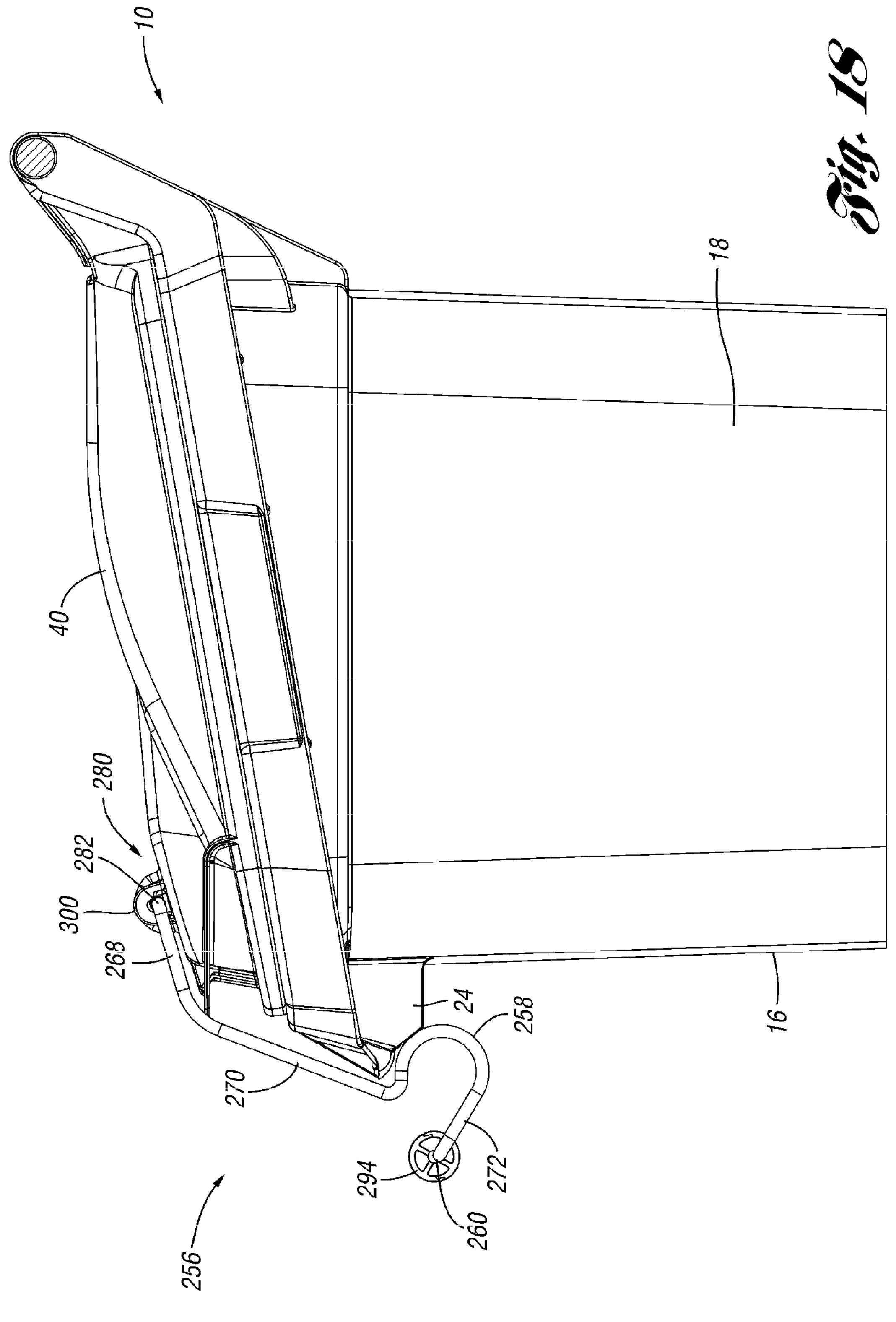
FIG. 18 is a side view of the cart of FIG. 16 showing the latch in the latched position.

FIG. 17 is a front view of the cart 10 showing the latch 256 in the locked position and FIG. 18 is a side view of the cart 10 showing the latch 256 in the locked position. FIG. 19 is an isometric bottom view of the lid 40 showing the latch 256 in the locked position. The base portions 286 are in abutting contact with a front wall 312 of the recess 304.

Figure 20:
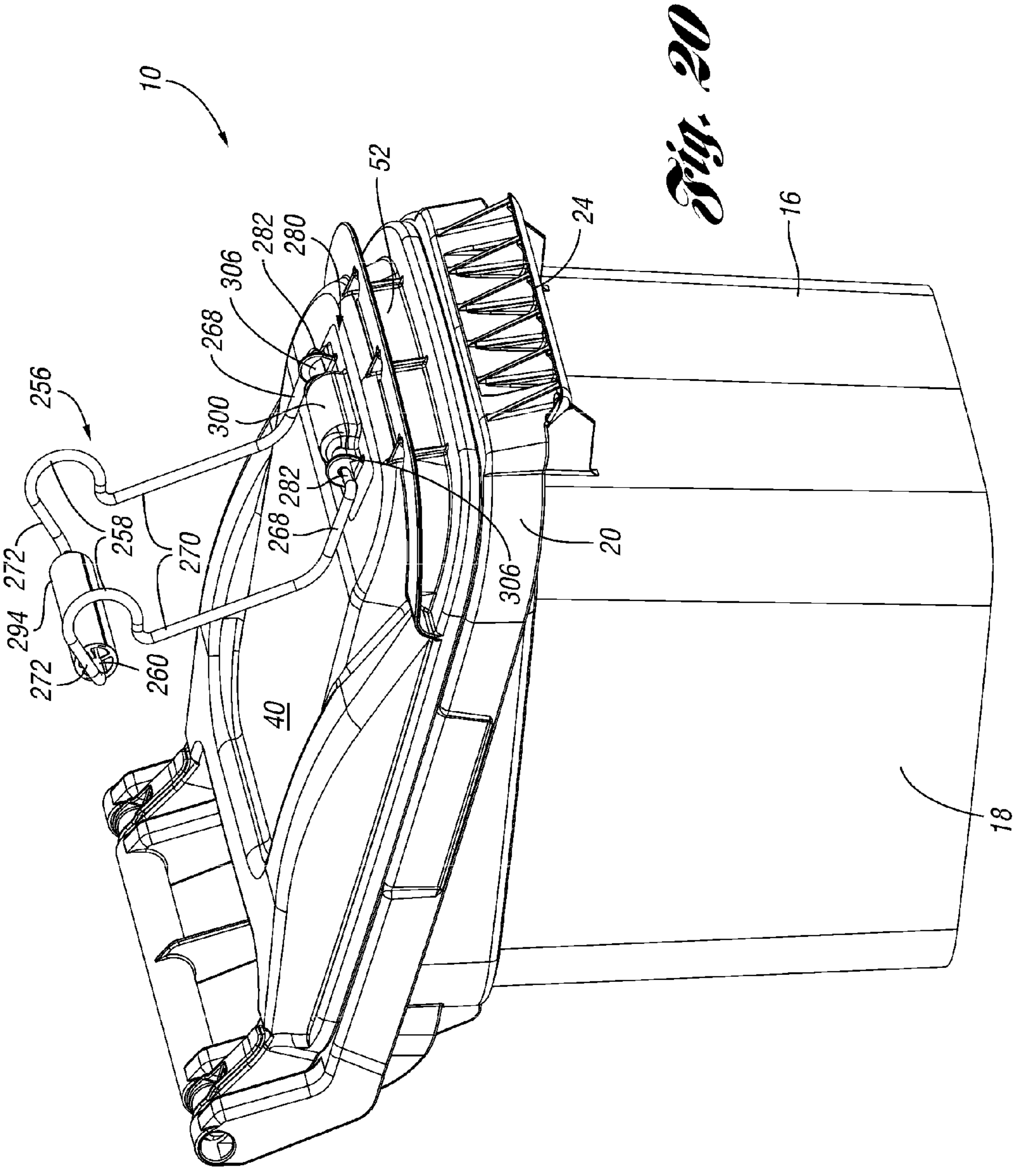
FIG. 20 is an isometric view of the cart of FIG. 16 with the latch in the unlatched position.
Figure 21:
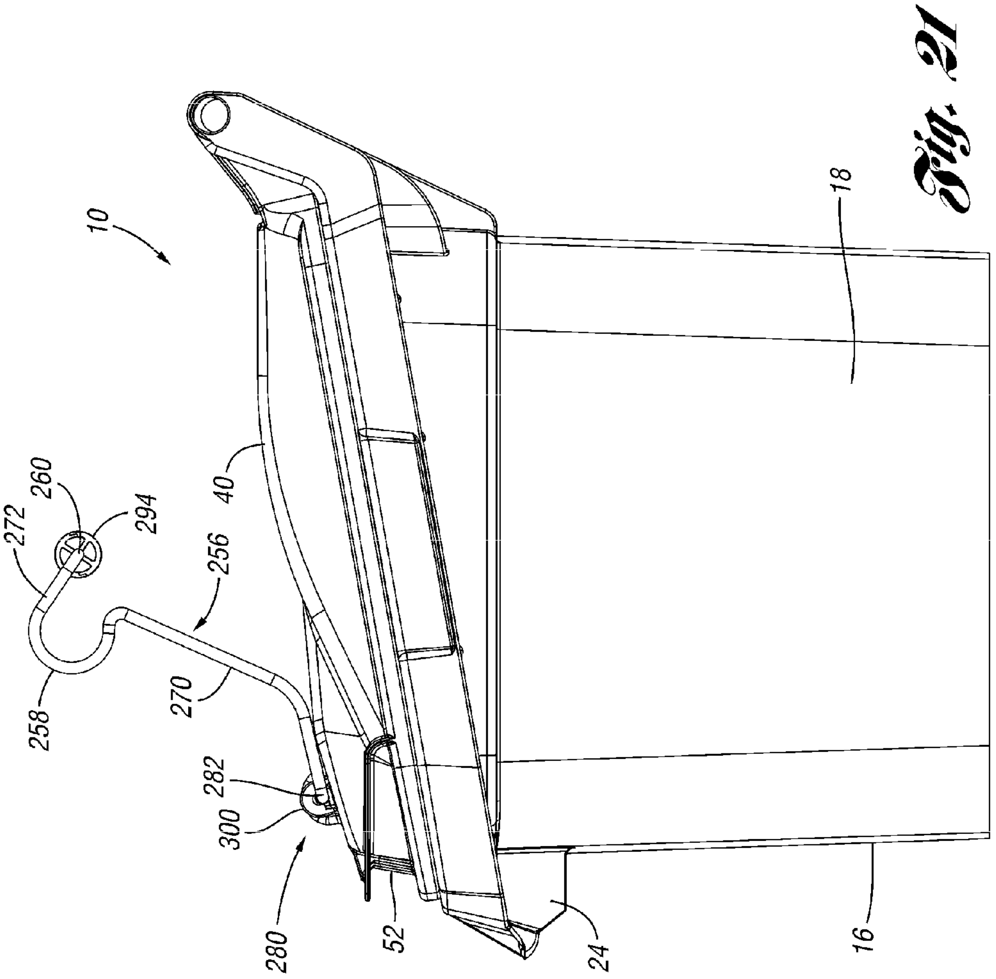
FIG. 21 is a side view of the cart of FIG. 16 showing the latch in the unlatched position.

FIG. 20 is an isometric view of the latch 256 in the unlocked position and FIG. 21 is a side view of the cart 10 with the latch 256 in the unlocked position. FIG. 22 is an isometric bottom view of the lid 40 with the latch 256 in the unlocked position. The base portions 286 are in abutting contact with a rear wall 314 of the recess 304.

Figure 23:
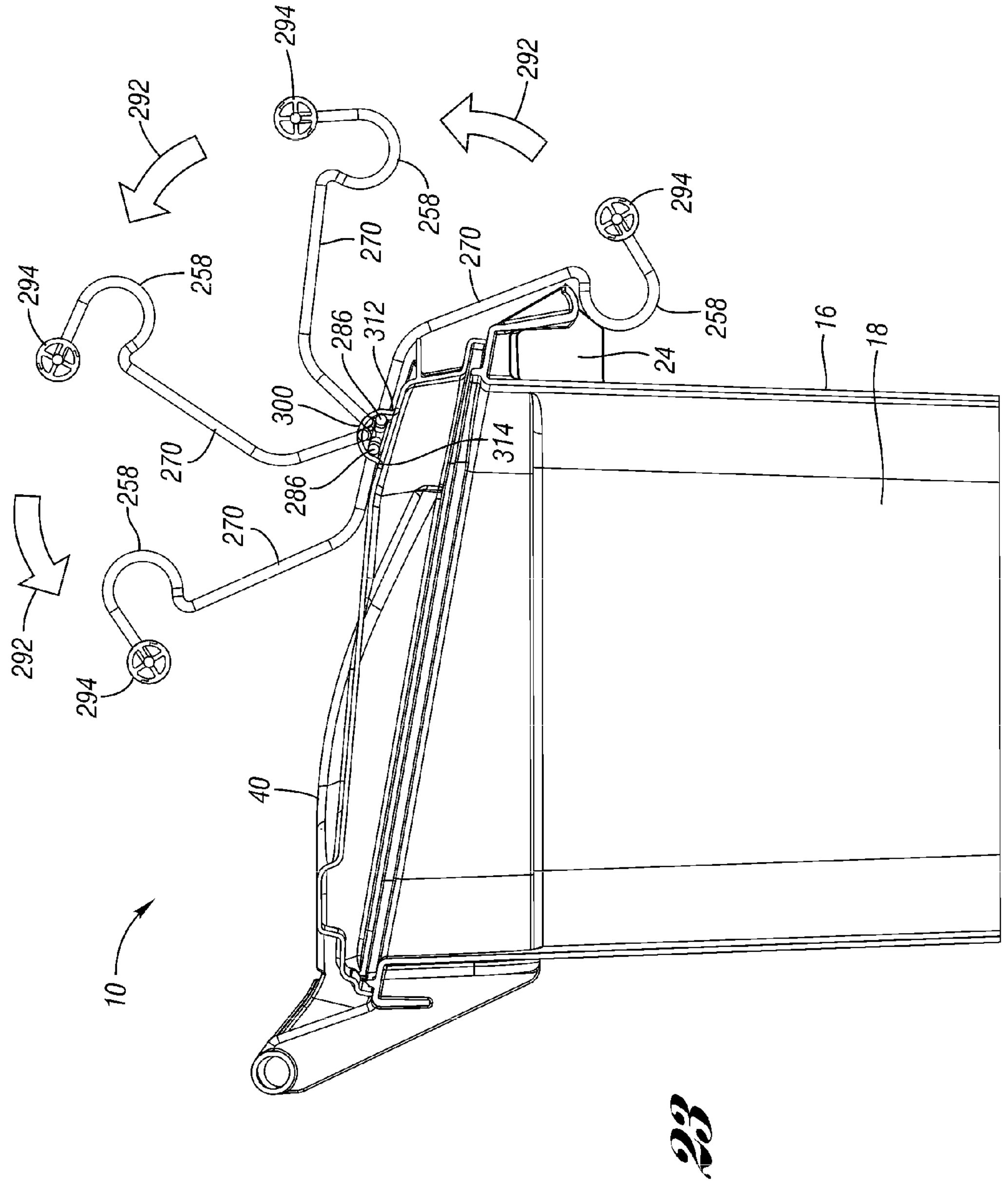
FIG. 23 is a side view of the cart of FIG. 16 showing the latch moving along an unlocking path.
Figure 24:
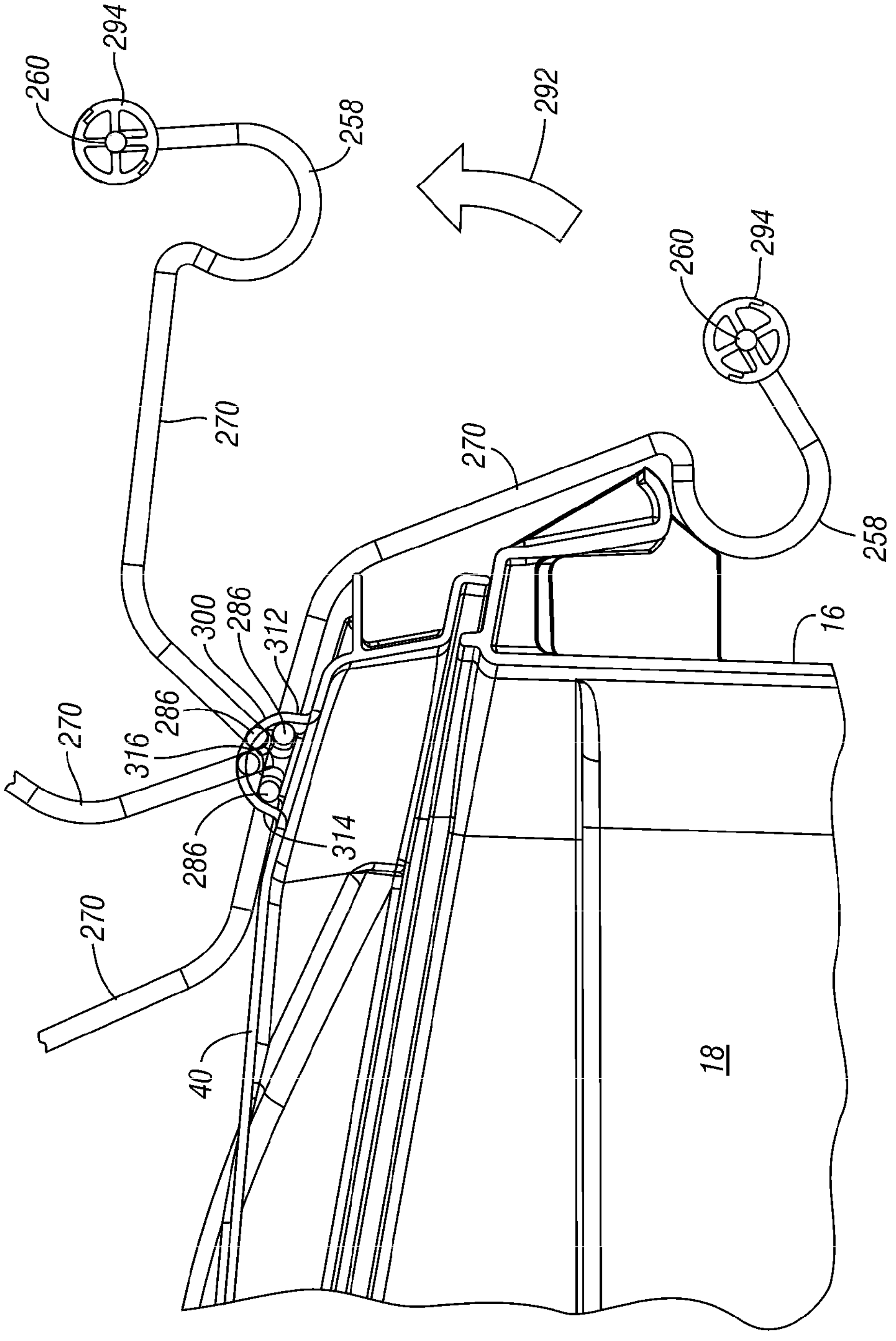
FIG. 24 is an enlarged sectioned view of the latch of FIG. 23 during movement along the unlocking path.

As the latch 256 is unlatched, the latch 256 moves along an unlocking path 292 as indicated in FIG. 23. FIG. 24 provides an enlarged sectioned view of the latch 256 during movement along the unlocking path 292.

Due to the offset between the base portions 286 and the inward arm portions 282, and due to the contact of the base portions 286 with walls of the recess 304, as the latch 256 moves along the unlocking path 292 (FIG. 23), the base portions 286 react and slide along the front wall 312 of the recess 304, along a bottom wall 316 of the recess, and finally rest against the rear wall 314 of the recess in a resilient manner such that a biasing force holds the latch 256 in the unlocked position once moved to the final unlocked position as shown in FIG. 21. The latch 256 and associated handle portion 260 remain in this position until a force is exerted on the handle portion 260 to return the latch 256 to the latched position as shown in FIG. 16.

FIGS. 23-24 appear to show that the base portions 286 are going through, i.e. passing into and out of, a wall of the lid itself; however, the base portions 286 are merely bending or deflecting against the recess walls in a manner similar to that described above with regard to FIGS. 9-15. The resilient material of the latch 256 allows the latch 256 to deflect and bend during movement along the unlocking path 292 which generates the biasing force that holds the handle portion 260 of the latch in the unlatched position.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

Further, although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A cart comprising:

a cart body having a base wall, front wall, rear wall, and a pair of side walls that cooperate with each other to define a cart interior;

a lid moveable about a hinge connection to the cart body between an open position to provide access to the cart interior and a closed position to prevent access to the cart interior, wherein the lid is pivotally attached to the rear wail with the hinge connection; and a latch mounted to the lid to lock the lid in the closed position;

wherein the cart body includes a lip extending outwardly and then downwardly from upper edges of the front and side walls, and including a flange extending outwardly from a front of the lip, and wherein the latch is pivotally attached to the lid such that the latch engages a lower surface of the flange when in a latched position; and a plurality of gussets associated with the flange, wherein the plurality of gussets comprise at least one first gusset extending between an upper surface of the flange and the lip and at least one second gusset that extending between the lower surface of the flange and the front wall.

2. The cart according to claim 1 wherein the lid includes a flange portion and wherein the latch includes a mount portion that is pivotally mounted to the flange portion such that the latch can be pivoted between a latched position and an unlatched position.

3. The cart according to claim 1 wherein the latch includes a retaining portion resiliently engages the lower surface of the flange when in a latched position.

4. The cart according to claim 1 wherein the latch is mounted adjacent a front edge of the lid, and wherein the cart includes a handle at a rear edge of the lid and wheels to movably support the cart.

5. The cart according to claim 1 wherein the latch includes a handle that is selectively moveable to both unlatch the latch and move the lid to the open position.

6. The cart according to claim 1 wherein the latch includes a first retaining portion that cooperates with the cart to hold the lid in the closed position until an unlatching force is exerted on the latch and a second retaining portion that cooperates with the lid to hold the latch in an unlatched position until a re-latching force is exerted on the latch.

7. The cart according to claim 1 wherein the latch is pivotally connected to the lid at one end and extends to a pair of spaced apart retaining portions at an opposite end that snap-fit under the flange of the cart to latch the lid in the closed position.

8. The cart according to claim 7 wherein the latch includes a handle portion that connects the pair of spaced apart retaining portions, the handle portion being selectively actuatable to latch and unlatch the lid.

9. The cart according to claim 8 wherein the latch includes a pair of hinge member portions that extend inwardly toward each other, a pair of side arm portions that extend from the hinge member portions, and a pair of front arm portions that extend from the side arm portions to the retaining portions.

10. The cart according to claim 9 wherein the hinge member portions are mounted within holes formed within the lid.

11. The cart according to claim 9 wherein, when in a latched position, the side arm portions curve inwardly toward each other and extend forwardly toward a front of the cart, and the front arm portions extend forwardly and downwardly from the side arm portions to the retaining portions which extend inward and upward under the flange.

12. The cart according to claim 8 wherein the latch includes a connection portion that cooperates with the lid to firmly hold the latch in an unlatched position until a re-latching force is exerted on the latch.

13. The cart according to claim 12 wherein the connection portion comprises a pair of base portions that extend toward each other and a pair of inward arm portions that are pivotally secured to the lid, the base portions being non-collinear with the inward arm portions to create an offset between the inward arm portions and the base portions.

14. The cart according to claim 13 wherein the latch includes a pair of side arm portions that extend from the inward arm portions and a pair of front arm portions that extend from the side arm portions to the retaining portions, and including a pair of transition portions that extend between the inward arm portions and the base portions to create the offset.

15. The cart according to claim 13 wherein the lid includes at least one upwardly extending mounting boss for each inward arm portion.

16. The cart according to claim 15 wherein, as the inward arm portions pivot within the mounting bosses, the base portions react against an upper surface of the lid to generate a biasing force that holds the latch in the unlatched position.

17. The cart according to claim 13 wherein the lid includes a housing portion that extends upwardly from an upper surface of the lid and forms a corresponding recess underneath the lid, and wherein the inward arm portions extend into the recess.

18. The cart according to claim 17 wherein the latch includes a pair of transition portions that extend between the inward arm portions and the base portions to create the offset, and wherein, as the inward arm portions pivot with the lid, the base portions react against walls of the recess to generate a biasing force that holds the latch in the unlatched position.

19. The cart according to claim 1 wherein the cart body includes one or more supports extending rearwardly from the lip adjacent the rear wall and a pull handle that is secured to the supports, and wherein the lid includes arms located along a rear edge of the lid that hingeably secures the lid to the pull handle.

20. The cart according to claim 1 wherein the lid includes an upper flange that is spaced outwardly of a forward end of the lid, the upper flange comprising a handle to lift the lid.

21. A cart comprising:

a base wall, front wall, rear wall, and a pair of side walls that cooperate with each other to define a cart interior;

a lid moveable about a hinge connection between an open position to provide access to the cart interior and a closed position to prevent access to the cart interior; and a latch mounted to the lid to lock the lid in the closed position, wherein the latch is pivotally connected to the lid at one end and extends to a pair of spaced apart retaining portions at an opposite end that snap-fit under a flange of the cart to latch the lid in the closed position, wherein the latch includes a handle portion that connects the pair of spaced apart retaining portions, the handle being selectively actuatable to latch and unlatch the lid, wherein the latch includes a connection portion that cooperates with the lid to firmly hold the latch in an unlatched position until a re-latching force is exerted on the latch, wherein the connection portion comprises a pair of base portions that extend toward each other and a pair of inward arm portions that are pivotally secured to the lid, the base portions being non-collinear with the inward arm portions to create an offset between the inward arm portions and the base portions, wherein the latch includes a pair of side arm portions that extend from the inward arm portions and a pair of front arm portions that extend from the side arm portions to the retaining portions, and including a pair of transition portions that extend between the inward arm portions and the base portions to create the offset, and wherein the handle portion, the inward arm portions, and the base portions are generally parallel to each other.

22. A method for assembling a cart comprising:

pivotally attaching a lid to a cart body with a hinge connection, the cart body having a base wall, a front wall, a rear wall, and a pair of side walls that cooperate with each other to define a cart interior;

pivotally attaching the lid to the rear wall with the hinge connection;

mounting a latch to the lid such that the latch is selectively moveable between a latched position where the lid is held secured to the cart body to prevent access to the cart interior and an unlatched position where the latch is released from the cart body to allow the lid to be pivoted toward an open position via the hinge connection to allow access to the cart interior;

forming a lip that extends outwardly and then downwardly from upper edges of the front and side walls, extending a flange outwardly from a front of the lip, and pivotally attaching the latch to the lid such that the latch engages a lower surface of the flange when in the latched position; and reinforcing the lip with a plurality of gussets that comprise at least one gusset extending between an upper surface of the flange and the lip and at least one gusset extending between the lower surface of the flange and the front wall.

23. The method according to claim 22 including forming supports to extend rearwardly from the lip adjacent the rear wall, and securing a pull handle to the supports, and forming arms along a rear edge of the lid and hingeably securing the lid to the handle with the arms.

24. The method according to claim 22 including forming an upper flange on the lid that is spaced outwardly of a forward end of the lid, the upper flange comprising a handle to lift the lid.

25. A method for assembling a cart comprising:

pivotally attaching a lid to a cart body with a hinge connection, the cart body defining a cart interior;

mounting a latch to the lid such that the latch is selective moveable between a latched position where the lid is held secured to the cart body to prevent access to the cart interior and an unlatched position where the latch is released from the cart body to allow the lid to be pivoted toward an open position via the hinge connection to allow access to the cart interior; and including pivotally connecting the latch to the lid at one end and wherein the latch extends to a pair of spaced apart retaining portions at an opposite end that snap-fit under a flange of the cart to latch the lid in the closed position, providing the latch with a handle portion that connects the pair of spaced apart retaining portions, the handle being selectively actuatable to latch and unlatch the lid, providing the latch with a connection portion that cooperates with the lid to firmly hold the latch in an unlatched position until a re-latching force is exerted on the latch, wherein the connection portion comprises a pair of base portions that extend toward each other and a pair of inward arm portions that are pivotally secured to the lid, the base portions being non-collinear with the inward arm portions to create an offset between the inward arm portions and the base portions, providing the latch with a pair of side arm portions that extend from the inward arm portions and a pair of front arm portions that extend from the side arm portions to the retaining portions, and including a pair of transition portions that extend between the inward arm portions and the base portions to create the offset, and forming the handle portion, the inward arm portions, and the base portions to be generally parallel to each other.

* * * * *